(12) United States Patent
Arguelles et al.

(10) Patent No.: US 10,095,596 B1
(45) Date of Patent: Oct. 9, 2018

(54) EXECUTING INTEGRATION TESTS IN A DISTRIBUTED LOAD AND PERFORMANCE EVALUATION FRAMEWORK

(71) Applicant: Amazon Technologies, Inc., Seattle, WA (US)

(72) Inventors: Carlos Alejandro Arguelles, Shoreline, WA (US); Meng Li, Seattle, WA (US); Andy Kohn, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 281 days.

(21) Appl. No.: 14/975,064

(22) Filed: Dec. 18, 2015

(51) Int. Cl.
  *G06F 9/44*  (2018.01)
  *G06F 11/263* (2006.01)
  *G06F 11/273* (2006.01)

(52) U.S. Cl.
  CPC .......... *G06F 11/263* (2013.01); *G06F 11/273* (2013.01)

(58) Field of Classification Search
  CPC ..................................................... G06F 11/263
  USPC .................................................. 717/123–129
  See application file for complete search history.

(56) References Cited

U.S. PATENT DOCUMENTS

| | | | | |
|---|---|---|---|---|
| 6,487,704 B1 * | 11/2002 | McNamara | ...... | G01R 31/31704 714/E11.167 |
| 6,519,228 B1 * | 2/2003 | Creamer | ................. | H04L 43/50 370/252 |
| 6,993,487 B2 * | 1/2006 | Bluvband | ................. | G06F 8/73 704/251 |
| 7,197,417 B2 * | 3/2007 | Pramanick | ......... | G01R 31/3183 702/108 |
| 7,610,578 B1 * | 10/2009 | Taillefer | .............. | G06F 11/3664 717/124 |
| 7,950,004 B2 * | 5/2011 | Vieira | ................. | G06F 11/3688 714/25 |
| 8,495,583 B2 * | 7/2013 | Bassin | ................. | G06F 11/008 717/124 |
| 8,549,481 B2 * | 10/2013 | Birsan | ................. | G06F 11/3664 703/13 |

(Continued)

OTHER PUBLICATIONS

Yuan et al, "Substra: A Framework for Automatic Generation of Integration Tests", ACM, pp. 64-70, 2006.*

(Continued)

*Primary Examiner* — Anil Khatri
(74) *Attorney, Agent, or Firm* — Lee & Hayes, PLLC

(57) ABSTRACT

A software testing framework provides functionality for utilizing pre-existing tests to load and performance test a network service. Methods can be tagged with annotations indicating that they are tests, such as integration tests. The methods implementing the integration tests can also be tagged with other types of annotations that can be used to select individual tests for use in testing, such as annotations indicating whether a test is a positive or negative test, annotations specifying dependencies upon other tests, or annotations indicating that a test is a member of a test suite. The annotations can be utilized in conjunction with test selection criteria to select individual integration tests for use in load and performance testing of the network service. The selected integration tests can be deployed to and executed upon load-generating instances to execute the integration tests and generate requests to the network service at high throughput.

18 Claims, 11 Drawing Sheets

(56) References Cited

U.S. PATENT DOCUMENTS

| | | | |
|---|---|---|---|
| 8,671,394 B1* | 3/2014 | Taillefer | G06F 11/3684 717/100 |
| 8,819,488 B1 | 8/2014 | Arguelles | |
| 8,839,201 B2* | 9/2014 | Schissel | G06F 11/368 717/124 |
| 8,839,202 B2* | 9/2014 | Tempel | G06F 9/45558 717/124 |
| 8,904,353 B1 | 12/2014 | Arguelles et al. | |
| 8,949,794 B2* | 2/2015 | Tempel | G06F 11/3664 715/234 |
| 8,984,341 B1 | 3/2015 | Chandrasekharapuram et al. | |
| 9,053,070 B1 | 6/2015 | Arguelles | |
| 9,367,435 B2* | 6/2016 | Sinyagin | G06F 11/3684 |
| 9,609,682 B2* | 3/2017 | Chang | H04W 76/027 |
| 9,703,683 B2* | 7/2017 | Hughes | G06F 11/3664 |

OTHER PUBLICATIONS

Saglietti et al, "Automated Unit and Integration Testing for Component-based Software Systems", ACM, pp. 1-6, 2010.*

Chakrabarti et al, "Test Sequence Computation for Regression Testing of Reactive Systems", ACM, pp. 131-132, 2008.*

KIm et al, "REMI: Defect Prediction for Efficient API Testing", ACM, pp. 990-993, 2015.*

Orellena et al, "On the Differences between Unit and Integration Testing in the TravisTorrent Dataset", IEEE, pp. 451-454, 2017.*

Re et al, "Minimizing Stub Creation During Integration Test of Aspect-Oriented Programs", ACM, pp. 1-6, 2007.*

Piel et al, "Data-flow Integration Testing Adapted to Runtime Evolution in Component-Based Systems", ACM, pp. 3-10, 2009.*

U.S. Appl. No. 13/966,867 titled "Cloud Based Performance Evaluation Tool" filed Aug. 14, 2013, first named inventor: Upadhyay, Divyang., 45 pps. (specification and figures).

U.S. Appl. No. 14/133,554 titled "Annotations-Based Generic Load Generator Engine" filed Dec. 18, 2013, First named inventor: Arguelles.

U.S. Appl. No. 14/133,554 titled "Annotations-Based Generic Load Generator Engine" filed Dec. 18, 2013, first named inventor: Arguelles, Carlos A., 201 pps. (specification and figures).

U.S. Appl. No. 14/540,831 titled "Hosted Load Generator" filed Nov. 13, 2014, first named inventor: Eichler, Ronnie A., 40 pps. (specification and figures).

U.S. Appl. No. 14/857,252 titled "Distributed Software Testing" filed Sep. 17, 2015, first named inventor: Arguelles, Carlos A., 55 pps. (specification and figures).

* cited by examiner

EXECUTING INTEGRATION TESTS IN A DISTRIBUTED LOAD AND PERFORMANCE EVALUATION FRAMEWORK

BACKGROUND

Prior to the deployment of a network service, it is important for various aspects of the operation of the network service to be extensively tested. For example, unit tests can be created and utilized to test aspects of individual units of the program code for the network service. Integration tests can also be created and utilized that test aspects of the operation of multiple combined units of program code for the network service. For instance, integration tests might be created that test the operation of external network interfaces exposed by a network service when all of its constituent program components have been deployed.

Developers of network services also commonly utilize load and/or performance testing platforms to test aspects of the operation of their network-based services under heavy network request loads. For example, such a platform might be configured to determine how a network service responds to increases in network traffic. Such a platform can commonly also measure latency, throughput, and error of operations. This data can be used by a developer to make scaling decisions for the network service (e.g. the number of hosts to use, the type of hosts, how the hosts are to be configured, etc.). The use of such a platform can, therefore, enable a developer to have a high level of confidence that their network service will withstand the volume of network traffic likely to be received by the service when deployed into a production environment.

In order to utilize a load and/or performance testing platform to test a network service, it is typically necessary for a software developer to create program code that interacts with the network service and to integrate this program code with the load and/or performance testing platform. Writing and integrating this program code can, however, take significant developer time and expertise. Moreover, the software developer is also required to maintain multiple different source code bases as a result, which can also be complex and time consuming.

The disclosure made herein is presented with respect to these and other considerations.

DETAILED DESCRIPTION

Figure 1:
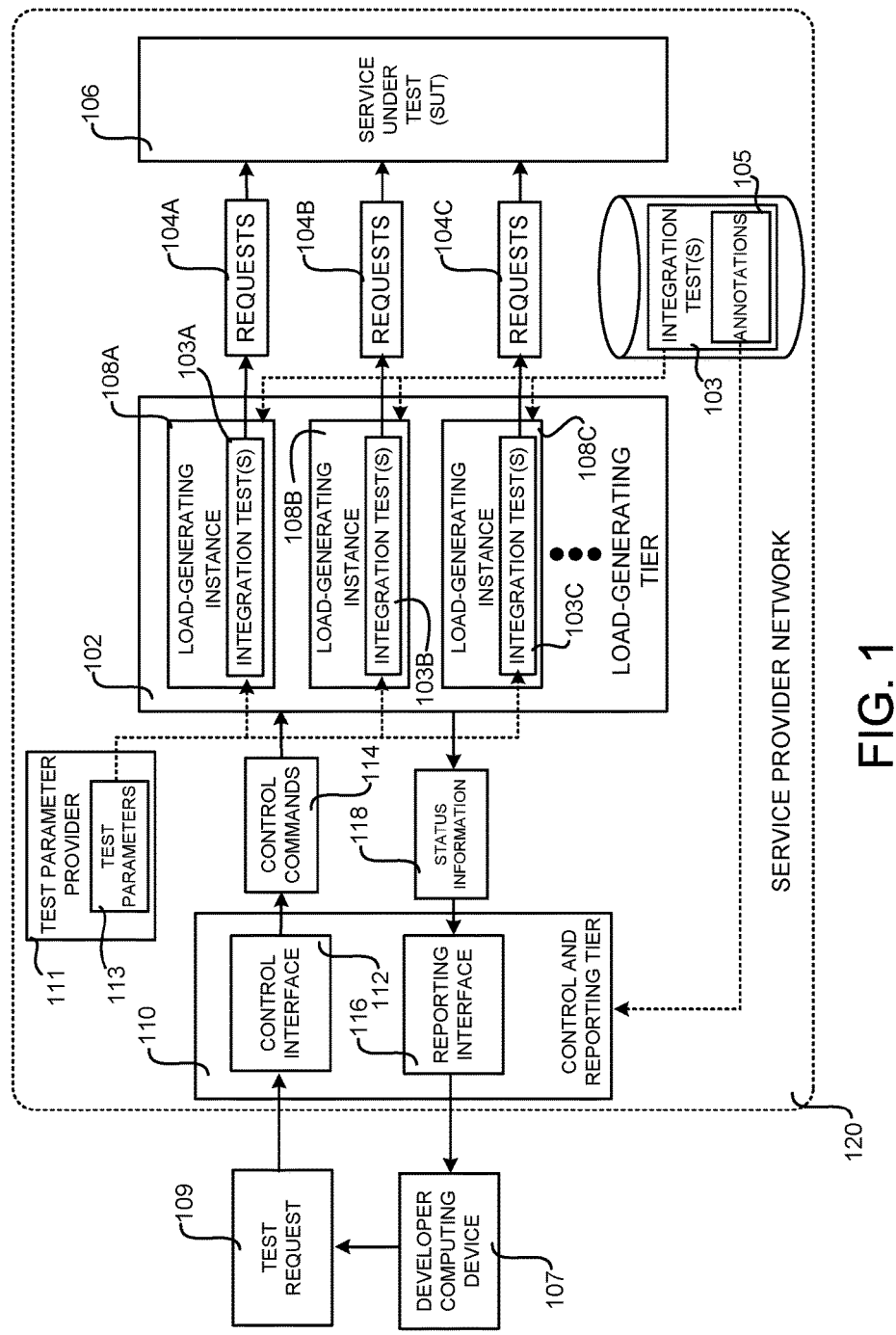
FIG. 1 is a software and networking architecture diagram that illustrates aspects of the configuration and operation of a distributed load and performance evaluation framework that is configured to execute integration tests, according to one configuration disclosed herein.

The following detailed description is directed to technologies for providing a distributed load and performance evaluation framework that is capable of executing integration tests for load and/or performance testing of a network service. Utilizing an implementation of the technologies described herein, the availability, reliability, and scalability of a network service can be evaluated by executing previously created integration tests. By utilizing integration tests for both integration testing and for load and/or performance testing, a software developer is freed from the task of creating integration tests along with separate tests for load and/or performance testing of the network service. Additionally, the utilization of one set of tests (i.e. integration tests) rather than two sets of tests (i.e. integration tests and separate load and/or performance tests), can result in greater code coverage, and can reduce memory utilization, storage utilization and, potentially, network bandwidth utilization. Additional technical benefits other than those described briefly above can also be realized through an implementation of the technologies disclosed herein.

In order to enable the functionality disclosed herein, a software testing service is provided in one configuration that implements a distributed load and performance evaluation framework. The software testing service is a network service that can execute in a service provider network that permits customers to purchase and utilize computing resources (which might be referred to herein simply as "resources") such as virtual machine ("VM") instances, data storage resources, database resources, networking resources, network services, and other types of computing resources on demand. The computing resources are provided by network services executing in the service provider network. For example, and without limitation, an on-demand computing service executing in a service provider network can be configured to provide computing resources such as VM instances on an as-needed basis for use in load and performance testing of a network service. Other services can also provide other types of computing resources on an as-needed basis.

According to one particular configuration, the distributed load and performance evaluation framework (which might be referred to herein as "the framework") includes a control and reporting tier and a separate load-generating tier. As will be described in greater detail below, the control and reporting tier and the load-generating tier can be implemented in a distributed fashion such that the operation of each tier is scalable, and such that the failure of components in one tier will not cause components in the other tier to also fail. The control and reporting tier and the load-generating tier can be executed on the same or different hardware or virtual machine instances within a service provider network.

In one implementation, one or more hardware computing systems or virtual machine instances are utilized to implement the control and reporting tier. The control and reporting tier provides a control interface, such as a user interface ("UP") or a network service application programming interface ("API"), such as a Web service API, through which a request can be made to perform load and performance testing of a network service (which might be referred to herein as the "service under test" ("SUT")) utilizing integration tests. Such a test request might, for example, be generated and submitted to the control interface by a software developer of the SUT.

In one implementation, the test request includes data identifying a software component that includes the integration tests that are to be utilized for load and performance testing. For example, the test request might include or specify the location of an archive, package, class, or another unit of program code that includes methods that are to be utilized for load and performance testing of a SUT.

The test request might also specify test selection criteria. As will be described in greater detail below, the test selection criteria is data that can be utilized to select integration tests that are to be utilized for load and performance testing of the SUT. The test request might also identify a desired load to place on the SUT. For example, the test request can specify the desired number of requests per time period (e.g. requests per second) that should be submitted to the SUT by the integration tests, the throughput that is to be delivered to the SUT, the number of concurrent connects that are to be made to the SUT, the transactions per second ("TPS") or other time period that are to be generated to the SUT, and/or another measure of the network or computational load to be placed on the SUT. The test request can also specify data describing the condition, or conditions, under which the testing should be stopped (e.g. a specified time period has elapsed or a specified number of requests have been submitted to the SUT).

In one configuration, tests are tagged with annotations that indicate their eligibility for use in testing. For instance, in one particular configuration, methods in an archive, package, class, or other unit of program code that are tests are marked with a specific annotation. The framework can utilize these annotations to identify the integration tests that are to be used in load and performance testing of the SUT.

In one particular configuration, for example, the control and reporting tier utilizes reflection to identify the integration tests that have been annotated in a manner that indicates their eligibility for use in testing. Reflection is a feature of certain programming languages (e.g. the JAVA® programming language) that makes it possible to inspect classes, interfaces, fields and methods at runtime, without knowing the names of the classes, methods etc. at compile time. Reflection also makes it possible to instantiate new objects, invoke methods, get and set field values, and perform other functions.

In some configurations, the integration tests are also tagged with other types of annotations that can be utilized to select integration tests for use in load and performance testing a SUT. For example, and without limitation, an integration test can be tagged with an annotation indicating that the integration test is a member of a suite of integration tests. In this example, the test selection criteria can specify that only integration tests that are members of a particular suite, or group, are to be utilized for load and performance testing. In this manner the annotations and the test selection criteria can be utilized in conjunction to select integration tests for use in load and performance testing of a SUT.

An integration test can also, or alternately, be tagged with other annotations such as, but not limited to, annotations indicating that the integration test is a positive test or a negative test. A positive test is an integration test for which a positive result is expected (i.e. the test is expected to pass). A negative test is an integration test for which a negative result is expected (i.e. the test is expected to fail). By supplying appropriate test selection criteria, a developer might specify that only positive or negative tests, or a blend of the two, are utilized for load and performance testing of a SUT. This type of annotation can also permit the load and performance testing framework to provide data indicating the overall test failure rate. Other types of annotations include, but are not limited to, annotations indicating that an integration test is dependent upon the outcome of another integration test, annotations specifying that an integration test utilizes a particular test parameter provider, and others.

In some configurations, a test request can also include other test parameters that specify the order in which the selected integration tests are to be performed. For example, and without limitation, the other test parameters can specify that the selected integration tests are performed randomly, sequentially, or in another specified order. Other types of test parameters defining other aspects of the manner in which integration tests are to be selected or performed can also be supplied with the test request.

In response to receiving a request to evaluate the performance of a SUT using integration tests, such as the test request described above, the control and reporting tier is configured to create a load-generating job for use by the load-generating tier. In particular, a load-generating job can be created that identifies one or more of the integration tests to be executed, a desired load to be placed on the SUT, and the condition, or conditions, under which the test should be discontinued. The load-generating job can then be placed on a job queue for consumption by one or more load-generating instances. Mechanisms other than a queue might also be utilized to provide load-generating jobs to components in the load-generating tier.

Load-generating instances in the load-generating tier are configured to execute the specified integration tests to generate requests to the SUT. The load-generating instances can be implemented as hardware devices or might be implemented as virtual machine instances. When implemented as virtual machine instances, the load-generating instances might be provided by a service provider network such as that described briefly above and in more detail below.

The load-generating instances operating in the load-generating tier can be configured to periodically examine the job queue to determine if a load-generating job is available. If a load-generating job is available, a load-generating instance with available processing capacity will dequeue the load-generating job from the job queue. The load-generating instance will then execute the integration tests, or tests, specified by the load-generating job to generate requests to the SUT.

Once the integration test, or tests, has completed execution, the load-generating instance can dequeue another load-generating job from the job queue. This process can continue until no further integration tests remain to be executed or a request is received to discontinue load and performance testing of the SUT. Additional details regarding the various components and processes described above for providing a distributed load and performance evaluation framework capable of utilizing integration tests to test a network service will be presented below with regard to FIGS. 1-10.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. As mentioned briefly above, the configurations described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a software and networking architecture diagram that illustrates aspects of the configuration and operation of a distributed load and performance evaluation framework that is configured to execute integration tests, according to one configuration disclosed herein. As discussed briefly above, the various configurations disclosed herein can be implemented in a service provider network 120. The service provider network 120 is a distributed network through which customers and/or other users can utilize computing resources, such as VM instances and/or other types of computing resources, on a permanent or as-needed basis.

Each type or configuration of a computing resource can be available from the service provider network 120 in different sizes. For example, a service provider might offer physical hosts, VM instances or other types of data processing resources that are available for purchase and use that have many different configurations of processor capabilities, main memory, disk storage, and operating system. A service provider operating the service provider network 120 might also offer other types of computing resources for purchase and use by customers. For example, a service provider might offer virtual or hardware devices, database resources and instances, file or block data storage resources, and/or networking resources, such as load balancing resources, domain name service ("DNS") resources, virtual private cloud ("VPC") resources, virtual local area network ("VLAN") resources, and/or other types of hardware and software computing resources or services on a permanent or as-needed basis. The computing resources might also include, but are not limited to, VM instances and images, security groups, option groups, gateways, option sets, network access control lists ("ACLs"), subnets, storage buckets, network interfaces, queues, snapshots, spot market requests, and storage volumes.

The service provider operating the service provider network 120 might also charge a fee for utilization of the computing resources to a customer that creates and uses the resources. The fee charged for a particular computing resource might be based upon the type and/or configuration of the computing resource. For example, in the case of a data processing computing resource, like a VM instance, the fee for use of the computing resource might be charged based upon the amount of time the computing resource is utilized. In the case of a data storage computing resource, the fee might be computed based upon the amount of data stored and/or the amount of data transferred into or out of the computing resource. The fees for other types of resources might also be based upon other considerations. A service provider might also utilize various purchasing models to determine the amount to charge a customer for use of resources provided by the service provider network 120.

The resources described above can be provided in one particular implementation by one or more data centers operated by the service provider. As known to those skilled in the art, data centers are facilities utilized to house and operate computer systems and associated components. Data centers also typically include redundant and backup power, communications, cooling, and security systems. The data centers might be located in geographically disparate regions, and might also be connected to various other facilities, such as co-location facilities, and various wide area networks ("WANs"), such as the Internet. Additional details regarding the configuration and operation of a data center for implementing the functionality disclosed herein for utilizing integration tests for load and performance testing are provided below with regard to FIG. 9.

The resources described briefly above might also be provisioned and de-provisioned as needed in an automated fashion. For example, the service provider network 120 might be configured to create a new instance of a computing resource, such as a VM instance, in response to an increase in demand for a network service or other condition. Other types of computing resources might also be provisioned and de-provisioned in a similar manner. Services in the service provider network 120 might also provide functionality for automatically scaling and/or de-scaling resources based upon demand for the resources and/or other factors.

A customer or potential customer of the service provider network 120 might utilize an appropriate computing system, such as the developer computing device 107, to communicate with the service provider network 120 over an appropriate data communications network (not shown in FIG. 1). In this way, a customer of the service provider network 120 can configure various aspects of the operation of the computing resources provided by the service provider network 120, or otherwise control any computing resources being utilized by the customer.

For example, and without limitation, a computing system utilized by a customer of the service provider network 120, such as the developer computing device 107, might be utilized to purchase computing resources in the service provider network 120, to configure aspects of the operation of the computing resources through a management console (not shown in FIG. 1) or other type of interface, to access and utilize functionality provided by the various services and systems described herein, and/or to perform other types of functionality with regard to the operation of the computing resources provided by the service provider network 120.

The developer computing device 107 might be any type of computing device capable of connecting to the service provider network 120 via a suitable data communications network such as, but not limited to, a laptop or desktop computer, a tablet computing device, a server computer, or a smartphone. Administrative users employed by the operator of the service provider network 120, such as administrators managing the operation of the service provider network 120, might also connect with, manage, and utilize resources provided by the service provider network 120 in a similar fashion.

As discussed briefly above, the service provider network 120 might also be configured to execute various types of network services to provide the various computing resources. For example, and without limitation, the service provider network 120 can provide an on-demand computing service for providing VM instances or other types of processing resources on-demand, a queue service, a data storage service for providing data storage resources and, potentially, other types of network-accessible services (not shown in FIG. 1) for providing other types of computing resources. These and other network services and their associated computing resources can be utilized together to implement various types of network-based applications in the service provider network 120, such as those described herein.

As discussed briefly above, a software testing service also executes in the service provider network 120 in one configuration that is configured to provide the distributed performance evaluation framework disclosed herein. The software testing service is configured to receive a request (e.g. the test request 109 shown in FIG. 1) to perform integration tests 103 on a network service 106 (which might be referred to herein as a "service under test"). The test request 109 might, for example, be generated and submitted to the framework by a software developer of the SUT 106 using the developer computing device 107. Other services in the service provider network 120 can also be configured to submit test requests 109 to the framework.

As described briefly above, and in greater detail below with respect to FIG. 2, in one implementation the test request 109 includes data identifying a software component that includes the integration tests 103 that are to be utilized for load and performance testing of the SUT 106. For example, the test request 109 might include or specify the location of an archive, package, class, or another unit of program code that includes methods defining the integration tests 103 that are to be utilized for load and performance testing of the SUT 106.

In some configurations, the test request also specifies test selection criteria. As will be described in greater detail below with regard to FIG. 2, the test selection criteria is data that can be utilized to select integration tests 103 that are to be utilized for load and performance testing of the SUT 106. For example, the test request 109 can specify the desired number of requests per time period (e.g. requests per second) that should be submitted to the SUT by the integration tests, the throughput that is to be delivered to the SUT, the number of concurrent connects that are to be made to the SUT, the TPS or other time period that are to be generated to the SUT, and/or another measure of the network or computational load to be placed on the SUT. The test request 109 can also include data describing the condition, or conditions, under which the testing should be stopped (e.g. a specified time period has elapsed or a specified number of requests have been submitted to the SUT 106). The test request 109 can also specify particular tests that are to be executed.

In one configuration, integration tests 103 are tagged with annotations 105 that indicate their eligibility for use in testing. For instance, in one particular configuration, methods in an archive, package, class, or other unit of program code that are test methods are marked with a specific annotation 105. The framework can utilize these annotations 105 to identify the integration tests 103 that are to be used by the framework in load and performance testing of the SUT 106.

In one particular configuration, for example, the control and reporting tier 110 (or another component) utilizes reflection to identify the available integration tests 103 for load and performance testing of the SUT 106. As mentioned above, reflection is a feature of certain programming languages (e.g. the JAVA® programming language) that makes it possible to inspect classes, interfaces, fields and methods at runtime, without knowing the names of the classes, methods etc. at compile time. Reflection also makes it possible to instantiate new objects, invoke methods, get and set field values, and perform other functions.

In some configurations, the integration tests 103 are also tagged with other types of annotations 105 that can be utilized to select integration tests 103 for use in load and performance testing the SUT 106. For example, and without limitation, an integration test 103 can be tagged with an annotation 105 indicating that the integration test 103 is a member of a suite, or group, of integration tests 103. In this configuration, for example, the test selection criteria can specify that only integration tests 103 that are members of a particular suite, or group, are to be utilized for load and performance testing of the SUT 106. In this manner, the annotations 105 and the test selection criteria can be utilized in conjunction to select integration tests 103 for use in load and performance testing of the SUT 106.

Other types of annotations 105 can also be added to the integration tests 103 that are specific to the load and performance testing of an SUT 106 as described herein. For example, and without limitation, annotations 105 can be added or existing annotations 105 can be extended to indicate that a particular test 103 is eligible (e.g. @loadperftest or @test(loadtest=true)) or is not eligible (e.g. @noloadperftest or @tests(loadtest=false)) for use in load and performance testing. Other annotations 105 specific to the load and testing framework disclosed herein can also be added to the integration tests 103 in other configurations.

The integration tests 103 can also, or alternately, be tagged with other annotations 105 such as, but not limited to, annotations 105 indicating that an integration test 105 is a positive test or a negative test. As mentioned above, a positive test is an integration test 103 for which a positive result is expected (i.e. the test is expected to pass). A negative test is an integration test 103 for which a negative result is expected (i.e. the test is expected to fail). In one particular implementation, for example, the annotations 105 might indicate a particular exception type that an integration test 103 will throw, and/or a regular expression that is to match the exception message. In this implementation, the load and performance testing framework disclosed herein considers a negative test as passing if it matches the specified criteria.

By supplying appropriate test selection criteria, a developer might specify that only positive or negative tests, or a blend of the two, are utilized for load and performance testing of the SUT 106. Other types of annotations 105 include, but are not limited to, annotations 105 indicating that an integration test 103 is dependent upon the outcome of another integration test 103, annotations 105 specifying that an integration test 105 utilizes test parameters 113 from a particular test parameter provider 111, and others. Additional details regarding these aspects will be provided below.

In some configurations, a test request 109 can also include other test parameters that specify the order in which the selected integration tests 103 are to be performed. For example, and without limitation, the other test parameters can specify that the selected integration tests 103 are performed randomly, sequentially, or in another specified order. Other types of test parameters defining other aspects of the manner in which integration tests 103 are to be selected or performed can also be supplied with the test request 109.

The integration tests 103 can be defined utilizing existing testing frameworks. For example, and without limitation, the integration tests 103 can be defined utilizing the JUNIT or TESTNG testing frameworks. Other frameworks can also be utilized. By utilizing integration tests 103 that are compatible with existing testing frameworks, the software developer of the SUT 106 is not required to create new tests for load and/or performance testing of the SUT 106.

In one particular configuration, the framework shown in FIG. 1 includes a load-generating tier 102 and a separate control and reporting tier 110. In other implementations, a single tier or more than two tiers might be utilized to provide the functionality described herein as being provided by the load-generating tier 102 and/or the control and reporting tier 110. As also described briefly above, one or more hardware computing systems or virtual machine instances can be utilized to implement the control and reporting tier 110 and/or the load-generating tier 102.

The control and reporting tier 110 can be configured to provide a control interface 112, such as a UI or a network service API, such as a Web service API (which might be referred to herein as a "load generating Web service API"), through which the test request 109 can be received. In response to receiving a test request 109, the control and reporting tier 110 is configured to utilize the data specified in the test request 109 and the annotations 105 to select the integration tests 103 that are to be performed on the SUT 106. Additional details regarding this process will be provided below.

Once the integration tests 103 to be used to test the SUT 106 have been selected, the control interface 112 transmits control commands 114 to the load-generating tier 102 instructing the load-generating tier 102 to execute specified integration tests 103 to evaluate the performance of the SUT 106. In one configuration, for instance, the control interface 112 creates a load-generating job (not shown in FIG. 1) for use by the load-generating tier 102. The load-generating job can include data identifying the integration tests 103 to be executed, data indicating the order in which the integration tests 103 are to be executed, the desired network or computational load to be generated to the SUT 106, and/or other parameters.

As mentioned above, the load-generating tier 102 includes one or more load-generating instances 108A-108C (which might be referred to herein singularly as "as a load generating instance 108" or collectively as "the load generating instances 108") in one particular configuration. As discussed briefly above, the load-generating instances 108 can be implemented as hardware devices or might be implemented as virtual machine instances. When implemented as virtual machine instances, the load-generating instances 108 might be provided by an on-demand computing service (not shown in FIG. 1) executing within the service provider network 120. In this way, the load-generating instances 108 can be created and utilized as needed to execute integration tests 103 for evaluating the performance of the SUT 106. The load-generating instances 108 can then be de-provisioned once testing has been completed.

The load-generating instances 108 receive load-generating jobs and utilize the load generating jobs to obtain the integration tests 103 specified by the test request 109, such as the integration tests 103A-103C shown in FIG. 1. The integration tests 103 are executed on the load-generating instances 108 and generate requests 104A-104C (which might be referred to herein singularly as "a request 104" or collectively as "the requests 104") to the SUT 106. The requests 104 might be requests for the SUT 106 to perform some type of processing, to provide some type of data in response to the request 104 such as a text, image or video file, or other types of requests 104.

As will be described in greater detail below the load-generating instances 108 can be configured to communicate with one another to ensure that the desired load is being provided to the SUT 106. Moreover, additional load-generating instances 108 can be added to the load-generating tier 102 until the desired load is being provided to the SUT 106 by the integration tests 103. The load-generating instances 108 will continue executing integration tests 103 for submitting requests 104 to the SUT 106 until one or more conditions specified by a load-generating job have occurred, or a request to stop testing has been received. The load-generating instances 108 will then stop execution of the integration tests 103 and can be de-provisioned in certain configurations. Additional details regarding this process will be provided below.

The control interface 112 might also be configured to receive and provide other types of control commands 114 to the load-generating tier 102. For example, the control interface 112 might receive control commands 114 for modifying, stopping, or deleting load-generating jobs. Other types of control commands 114 might also be received and provided to the load-generating tier 102. In response to receiving such control commands 114, the load-generating instances 108 in the load-generating tier 102 will take appropriate action, such as modifying, stopping, or deleting a load-generating job.

As also mentioned briefly above, the load-generating instances 108 in the load-generating tier 102 might also be configured to periodically provide status information 118 regarding the status of each load-generating job to the control and reporting tier 110. For example, the load-generating instances 108 might be configured to provide status information 118 to the control and reporting tier 110 indicating that a job is processing, running, is stopping, has been stopped, is deleting, or is complete. The control interface 112 in the control and reporting tier 110 might also provide a reporting interface 116, such as a UI or an API, through which the job status information 118 can be retrieved.

Additional details regarding the configuration and operation of the control and reporting tier 110 will be provided below with regard to FIGS. 2 and 5. Additional details regarding the configuration and operation of the load-generating tier 102 will be provided below with regard to FIG. 3. Additional details regarding the configuration and operation of the load-generating instances 108 will be provided below with regard to FIGS. 4, 6A, and 6B. Additional details regarding a service provider network 120 that can be utilized to implement components in the control and reporting tier 110, components in the load-generating tier 102, and/or the SUT 106 will be described in greater detail below with regard to FIGS. 7-10. Additional details regarding several illustrative load and performance evaluation frameworks can be found in U.S. patent application Ser. No. 14/857,252, entitled "Distributed Software Testing", filed on Sep. 17, 2015, and U.S. patent application Ser. No. 13/966,867, entitled "Distributed Performance Evaluation Framework," filed on Aug. 14, 2013, both of which are expressly incorporated herein in their entirety.

Figure 2:
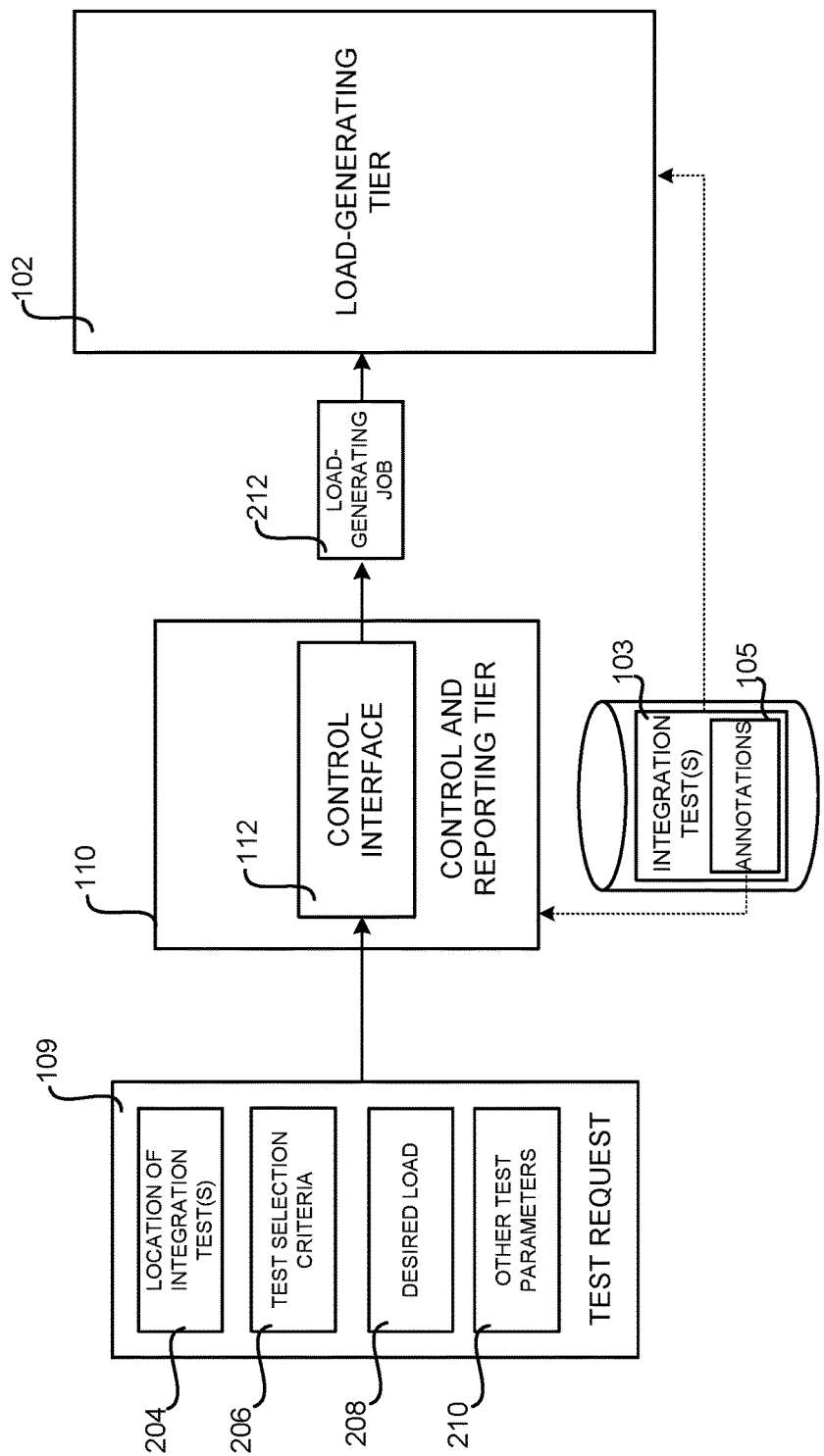
FIG. 2 is a software architecture diagram that illustrates additional aspects of the configuration and operation of a control and reporting tier that is a part of a distributed load and performance evaluation framework configured to execute integration tests in one configuration disclosed herein.

FIG. 2 is a software architecture diagram that illustrates additional aspects of the configuration and operation of a control and reporting tier 110 that is a part of a distributed load and performance evaluation framework configured to execute integration tests 103 in one configuration disclosed herein. As shown in FIG. 2 and described briefly above, the control interface 112 is configured in one configuration to provide an interface, such as a UI or a network service API, for receiving a test request 109 to evaluate the performance of a SUT 106 using integration tests 103. In the configuration shown in FIG. 2, the test request 109 includes data 204 identifying the location of the integration tests 103. Alternately, the test request 109 can include the actual integration tests 103 to be performed. As will be described in greater detail below, the load-generating instances 108 can retrieve the integration tests 103 from the specified location. The integration tests 103 are then executed on the load-generating instances 108 to generate the requests 104 to the SUT 106.

As shown in FIG. 2, the test request 109 can also include test selection criteria 206. As discussed briefly above, the control and reporting tier 110 utilizes the test selection criteria 206 to select particular integration tests 103 for use in testing the SUT 106. For example, and without limitation, the test selection criteria 206 might specify that integration tests 103 be utilized that have certain annotations 105, or combinations of annotations 105, associated therewith. For example, and without limitation, the test selection criteria 206 might specify that positive or negative integration tests 103, or a combination of both, be utilized. Similarly, the test selection criteria 206 might specify that integration tests 103 that have annotations 105 indicating that they are a part of a particular suite, or group, of integration tests 103 be utilized. Likewise, the test criteria 206 might specify that integration tests 103 that utilize test parameters 113 from a particular test parameter provider 111 be utilized. It should be appreciated that these examples are merely illustrative and that the test selection criteria 206 can specify that integration tests 103 having any type of annotation 105 or combination of annotations 105 be executed in any combination.

In some implementations, the test request 109 also specifies a desired load to be delivered to the SUT. For example, and as discussed above, the test request 109 can specify the desired number of requests per time period (e.g. requests per second) that should be submitted to the SUT by the integration tests, the throughput that is to be delivered to the SUT, the number of concurrent connects that are to be made to the SUT, the TPS or other time period that are to be generated to the SUT, and/or another measure of the network or computational load to be placed on the SUT. The test request 109 might also specify a condition, or conditions, under which the testing should be stopped. For example, the test request 109 might specify that the requests 104 should be submitted to the SUT 106 for a specified period of time or until a certain number of requests have been submitted to the SUT 106. The test request 109 might similarly specify that testing continue until the selected integration tests 103 have been executed a specified number of times.

The test request 109 might also include other test parameters 210 in other configurations. For example, and without limitation, the other test parameters 210 can specify that the selected integration tests 103 are performed randomly, sequentially, in round-robin order, or in another specified order. The other test parameters 210 can also specify the blend of integration tests 103 that are to be performed. For instance, as in the examples given above, the other test parameters 210 can specify that a certain percentage of integration tests 103 having a particular annotation 105 be executed and that another percentage of tests 103 having another annotation 105, or annotations 105, be executed. Other types of test parameters defining other aspects of the manner in which the integration tests 103 are to be selected or performed can also be supplied with the test request 109.

In response to receiving a test request 109, a component in the control and reporting tier 110, such as the control interface 112, is configured to utilize reflection to identify the available test methods. In one implementation where the JAVA® programming language is used, for instance, each method that is a test is tagged with a specific annotation (e.g. @Test). Reflection or another mechanism can be utilized to identify the methods that have been tagged with the required annotation 105 in this manner.

Once the available integration tests 103 have been identified, a component in the control and reporting tier 110, such as the control interface 112, is configured to utilize the test selection criteria 206 to select the particular integration tests 103 to utilize from the available integration tests 103. As discussed above, the test selection criteria 206 can specify that integration tests 103 having certain annotations 105 be utilized. The test selection criteria 206 might alternately specify that integration tests 103 that are members of a particular package, archive, class, container, or other unit of program code be utilized. Reflection can also be utilized to identify the integration tests 103 that are to be utilized.

Once the integration tests 103 to utilize in load and performance testing of the SUT 106 have been selected, a component in the control and reporting tier 110, such as the control interface 112, is configured to create a load-generating job 212 for use by the load-generating tier 102. The load-generating job 212 can identify the location of the integration tests 103 to be performed, the desired load to be delivered to the SUT, and the condition, or conditions, under which the load-generating job should be discontinued. The load-generating job 212 might also include the other test parameters 210 described above.

A component within the control and reporting tier 110, such as the control interface 112, can then place the load-generating job 212 on a job queue (not shown in FIG. 2) in the load-generating tier 102 for consumption by one or more of the load-generating instances 108. Mechanisms other than a queue might also be utilized to provide load-generating jobs 212 to components in the load-generating tier 102 for load and performance testing of the SUT 106 utilizing the integration tests 103. Additional details regarding this process will be provided below with regard to FIG. 3.

Figure 3:
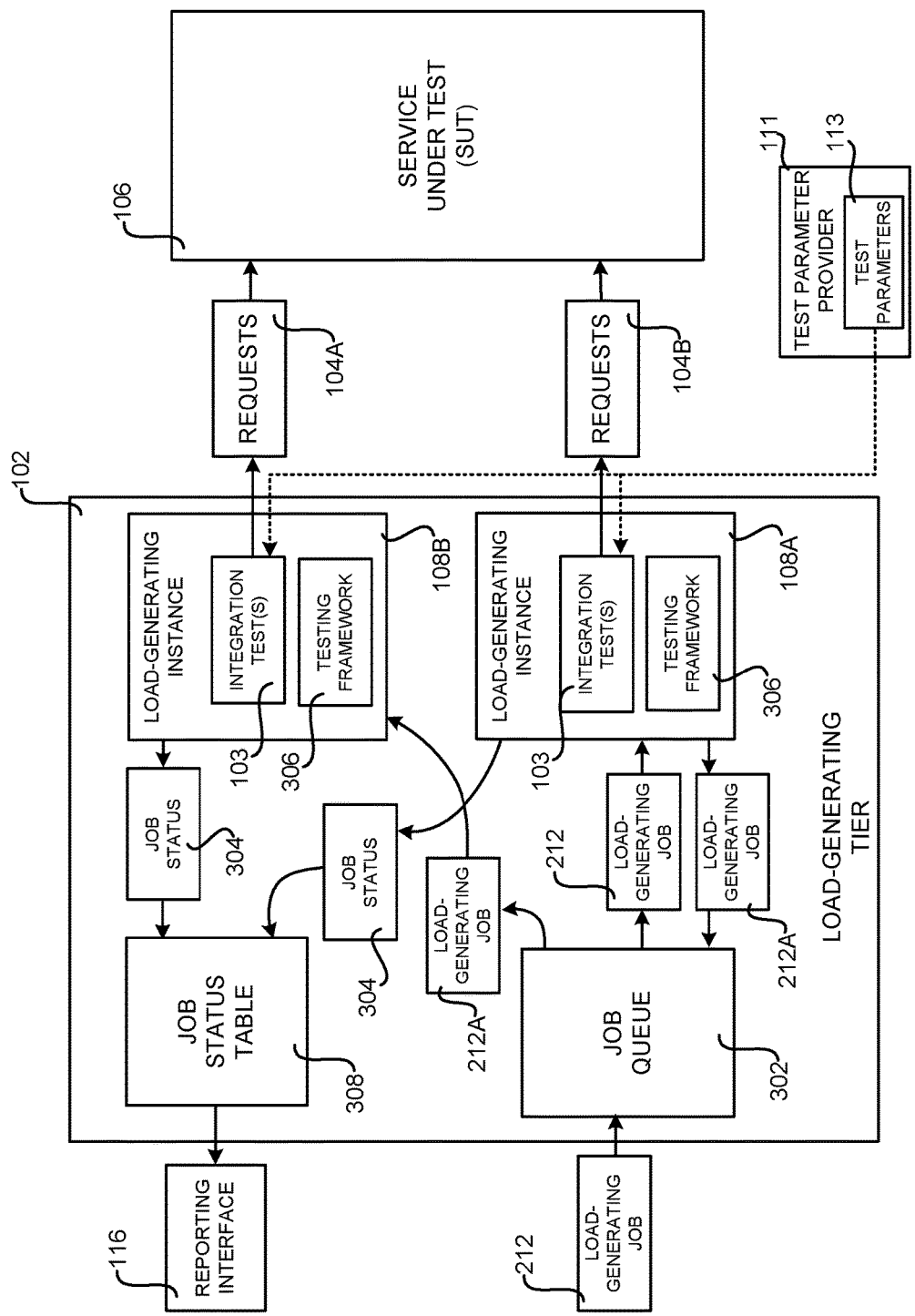
FIG. 3 is a software architecture diagram that illustrates additional aspects of the configuration and operation of a load-generating tier that is a part of a distributed load and performance evaluation framework capable of executing integration tests in one configuration disclosed herein.

FIG. 3 is a software architecture diagram that illustrates additional aspects of the configuration and operation of a load-generating tier 102 that is a part of a distributed load and performance evaluation framework capable of executing integration tests 103 in one configuration disclosed herein. As shown in FIG. 3 and described briefly above, a component in the control and reporting tier 110 is configured to place load-generating jobs 212 on a job queue 302 in the load-generating tier 102. The job queue 302 is a distributed queue provided by the service provider network 120 in one implementation. The job queue 302 might also be provided by other computing systems in other configurations. Additionally, mechanisms other than a queue might also be utilized to enable communication between load-generating instances 108 in other implementations.

The load-generating instances 108 operating in the load-generating tier 102 are also configured to periodically examine the job queue 302 to determine if a load-generating job 212 is available on the queue 302. If a load-generating job 212 is on the job queue 302, an existing load-generating instance 108 with available processing capacity will dequeue the load-generating job 212 from the job queue 302. The load-generating instance 108 will then obtain and execute the integration test 103, or tests, identified by the dequeued load-generating job 212 to generate requests to the SUT 106. Each load-generating instance 108 might include framework components for hosting and executing the integration tests 103.

In the example shown in FIG. 3, for instance, the load-generating instance 108A has dequeued the load-generating job 212A from the job queue 302. The load-generating instance 108A then executes the integration tests 103A specified by the load-generating job 212A to generate the requests 104B to the SUT 106. The integration tests 103 can also obtain test parameters 113 from a test parameter provider 111. The test parameter provider 111 might be a network service, for example, that is configured to receive and respond to requests from the integration tests 103 for the test parameters 113. The test parameters 113 can be used in the requests 104 to load and performance test various aspects of the SUT 106. In some configurations, multiple test parameter providers 111 can be utilized simultaneously. In these configurations, the load and performance testing framework disclosed herein can keep track of the test parameters 113 provided by each provider 111 so that test parameters 113 are utilized only once during testing.

As discussed briefly above, the load-generating instances 108 can be implemented as hardware devices or might be implemented as virtual machine instances. When implemented as virtual machine instances, the load-generating instances 108 might be provided by an on-demand computing service executing in the service provider network 120. Using facilities provided by the service provider network 120, virtual machine instances can be instantiated and utilized as-needed to execute the integration tests 103 to generate the requests 104 to the SUT 106. The virtual machine instances can then be de-provisioned once testing has been completed. Additional details regarding a service provider network 120 configured to provide this functionality will be provided below with regard to FIGS. 7-10.

Each load-generating instance 108 is also configured to determine if it is supplying the desired load specified by the test request 109 and the load-generating job 212 to the SUT 106. If a load-generating instance 108 is supplying the desired load specified by a load-generating job 212 to the SUT 106, the load-generating instance 108 will continue executing the specified integration tests 103 to generate the requests 104 to the SUT 106 until the specified conditions for the load-generating job 212 to be stopped have been reached or until a control command 114 is received indicating that the job should be stopped.

If a load-generating instance 108 is not supplying the desired load specified by the test request 109 and the load-generating job 212 to the SUT 106, the load-generating instance 108 will enable other load-generating instances 108 to also submit requests 104 to the SUT 106. For example, in one configuration, a load-generating instance 108 can place a new load-generating job 212A on the job queue 302 for the unmet portion of the desired load. Another load-generating instance 108 can then retrieve the load-generating job 212 from the job queue 302 and execute the same or different integration tests 103 to generate requests to the same SUT 106 in the manner described above.

In the example shown in FIG. 3, for instance, the load-generating instance 108A has determined that it is not supplying the desired load specified in the test request 109 and the load-generating job 212 to the SUT 106. As a result, the load-generating instance 108A has placed a new load-generating job 212A on the job queue 302 for the unmet load. In turn, another load-generating instance 108B has retrieved the load-generating job 212A from the job queue 302. The load-generating instance 108B then obtains and executes the integration tests 103B specified by the load-generating job 212A to submit requests 104A to the SUT 106. Load-generating instances 108 can be added in this manner until the desired load is being submitted to the SUT 106. Once the specified condition, or conditions, for stopping the evaluation of the SUT 106 has been reached or a control command to stop execution has been received, execution of the integration tests 103 are stopped.

As discussed briefly above, the load-generating instances 108 might also be configured to periodically provide job status data regarding the status of each load-generating job 212 that is being executed to the control and reporting tier 110. For example, in one configuration the load-generating instances 108 write data to a job status table 308 indicating that a load-generating job 212 is processing, running, is stopping, has been stopped, is deleting, or is complete. The control and reporting tier 110 might provide a reporting interface 116, such as a UI or an API, through which the job status information contained in the job status table 308 can be retrieved. Mechanisms other than a database table can be utilized to communicate information regarding the status of load-generating jobs from the load-generating tier to the control and reporting tier.

As also described briefly above, the annotations 105 for an integration test 103 can indicate that the test is dependent upon the execution of one or more other integration tests 103. If a load-generating instance 108 dequeues a load-generating job 212 that specifies execution of an integration test 103 that is dependent upon another integration test 103, or tests, the load-generating instance 108 can determine whether the test upon which the integration test 103 is dependent have completed execution. For example, and without limitation, the load-generating instance 108 can examine the job status table 308 to determine if the integration tests 103 upon which another integration test 103 is dependent have completed execution. If the other tests have completed execution, the load-generating instance 108 will execute the integration test 103 specified by the load-generating job 212.

If other integration tests 103 upon which a particular integration test 103 is dependent have not completed execution, the load-generating instance 108 can obtain and execute the integration tests 103 upon which the particular integration test 103 is dependent. The load-generating instance 108 can also subsequently execute the dependent integration test 103 or place a load-generating job 212A back on the job queue 302 for the dependent integration test 103. Other mechanisms can also be utilized to enforce dependencies between integration tests 103 specified by the annotations 105.

As shown in FIG. 3, a testing framework 306 can be installed and executed on the load-generating instances 108. The testing framework 306 can enable execution of the integration tests 103 and can also provide the functionality described above for retrieving load-generating jobs 212 from the job queue 302, for providing job status 304 information, and/or for providing other types of functionality not specifically mentioned herein.

Figure 4:
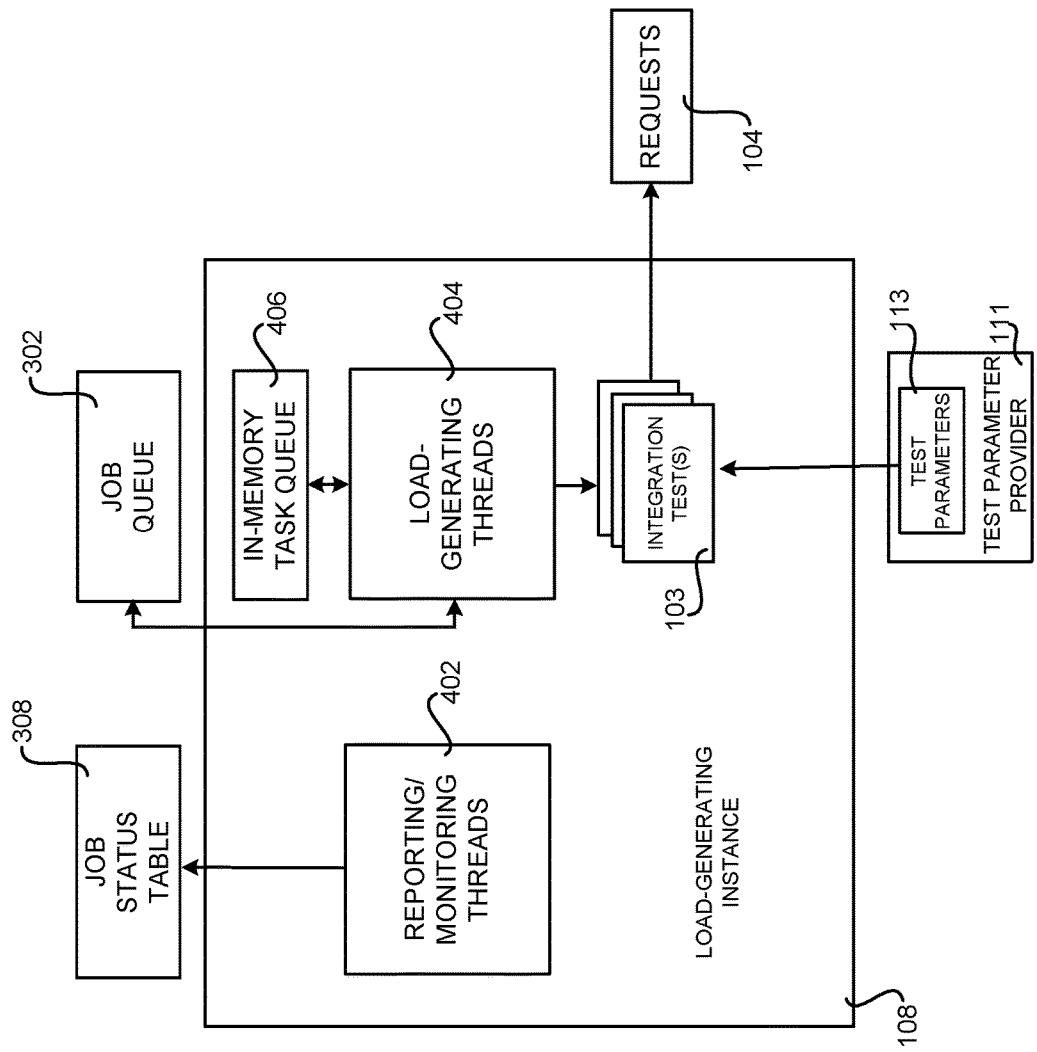
FIG. 4 is a software architecture diagram showing additional aspects of the configuration and operation of a load-generating instance configured to execute integration tests for load and performance testing of a network service, according to one configuration disclosed herein.

FIG. 4 is a software architecture diagram showing additional aspects regarding the configuration and operation of a load-generating instance 108 that is configured to execute integration tests 103 for load and performance testing of the SUT 106, according to one configuration disclosed herein. As shown in FIG. 4, each load-generating instance 108 executes one or more reporting/monitoring threads 402 and one or more separate load-generating threads 404 in one particular configuration. The reporting/monitoring threads 402 provide functionality for reporting the status of load-processing jobs by way of the job status table 308 in the manner described above. The load-generating threads 404 are executed separately from the reporting/monitoring threads 402 and provide the functionality for executing the integration tests 103 that generate the requests 104 to the SUT 106.

As shown in FIG. 4, each load-generating instance 108 might also maintain an in-memory task queue 406. When one of the load-generating threads 404 dequeues a load-generating job 212 from the job queue 302, a job is placed on the in-memory task for executing the specified integration tests 103. Instances of the integration tests 103 are then executed to load and performance test the SUT 106 by generating the requests 104. Once execution of an integration test 103 has been completed, the load-generating threads 404 can dequeue another job from the in-memory task queue 406 and execute the corresponding integration test 103.

It should be appreciated that the software architecture shown in FIG. 4 is merely illustrative and that each load-generating instance 108 might be configured differently in other configurations. Additional details regarding the operation of the load-generating instances 108 will be provided below with regard to FIGS. 6A and 6B. It should also be appreciated that, in some implementations, the same load-generating instance 108 might be utilized to execute different integration tests 103 on behalf of different users or entities. In these implementations, mechanisms might be implemented at each load-generating instance 108 to ensure that the data associated with each user is inaccessible to other users. For example, partitioning schemes, encryption mechanisms, and other technologies might be utilized to ensure that one user of a load-generating instance 108 cannot view or otherwise access the data of another user.

Figure 5:
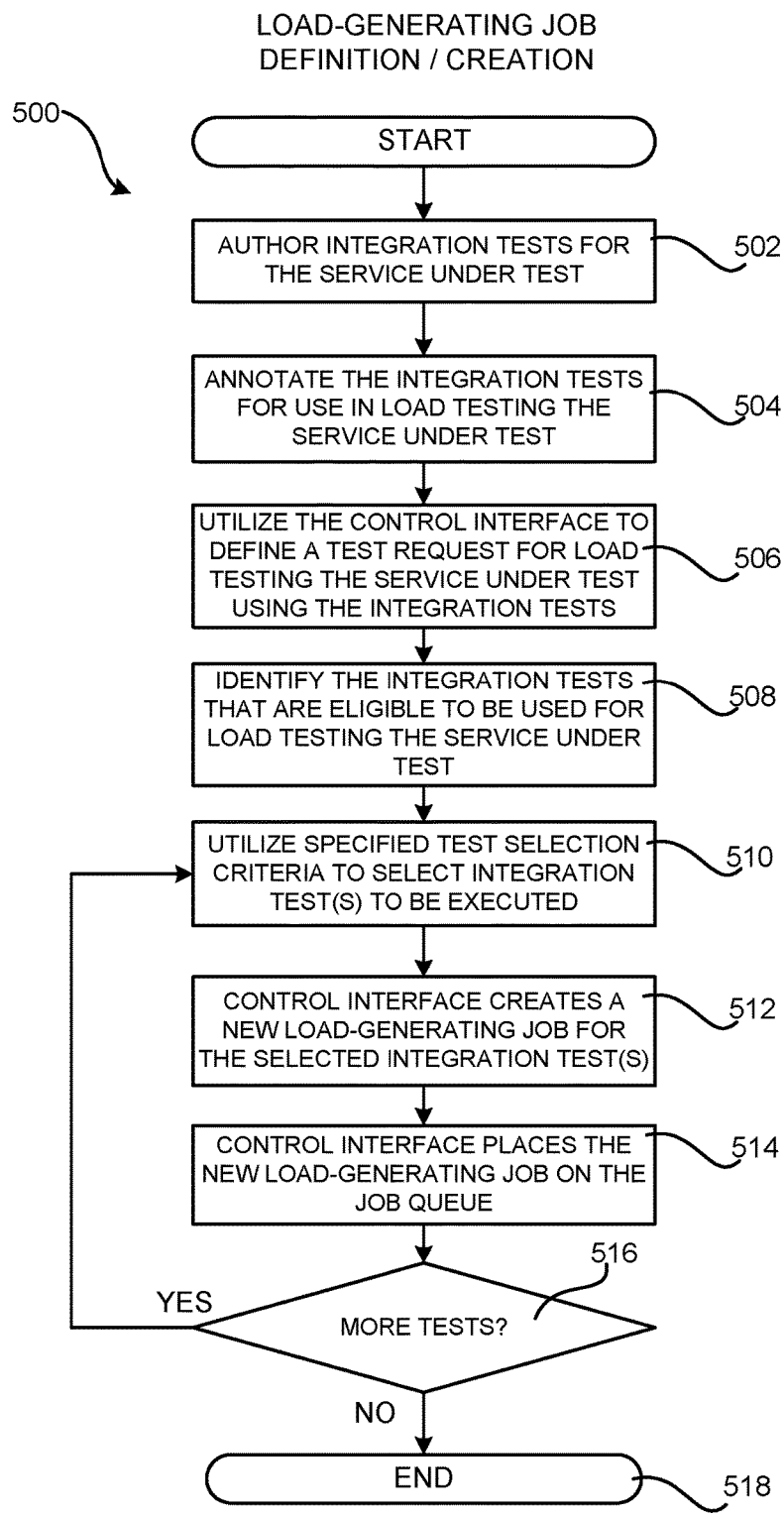
FIG. 5 is a flow diagram showing aspects of one illustrative routine for defining and creating a load-generating job utilized by a distributed performance evaluation framework to execute integration tests for load and performance testing of a network service, according to one configuration disclosed herein.

FIG. 5 is a flow diagram showing aspects of one illustrative routine 500 for defining and creating a load-generating job 212 utilized by a distributed performance evaluation framework to execute integration tests 103 for load and performance testing of a SUT 106, according to one configuration disclosed herein. It should be appreciated that the logical operations described herein with respect to FIG. 5, and the other figures, can be implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the figures and described herein. These operations can also be performed in parallel, or in a different order than those described herein.

The routine 500 begins at operation 502, where a user authors the integration tests 103. The integration tests 103 can be authored in virtually any declarative or scripted programming language. For example, in some configurations, the integration tests 103 are authored using the JAVA® programming language using an industry standard testing framework such as, but not limited to, the JUNIT or TESTNG testing frameworks. The integration tests 103 might also be authored using other languages in other configurations.

From operation 502, the routine 500 then proceeds to operation 504, where a user tags the integration tests 103 with annotations 105. As discussed above, the annotations 105 can indicate that a particular method is a test, for example. The annotations 105 can similarly indicate that an integration test 103 is dependent upon the execution of another integration test 103, indicate that an integration test 103 is a member of a suite, or group, of integration tests 103, indicate that an integration test 103 is a positive test or a negative test, or indicate that the integration test 103 utilizes test parameters 113 from a particular test provider 111. The annotations 103 can also provide other types of information associated with an integration test 103 that can be utilized to select particular integration tests 103 for use in testing the SUT 106. From operation 504, the routine 500 proceeds to operation 506.

At operation 506, the control interface 112, described above, can be utilized to define a test request 109 to evaluate the performance of the SUT 106. As described above with regard to FIG. 2, the test request 109 might be defined through a UI or an API provided by the control interface 112. As also mentioned above, the test request 109 might include data 204 identifying a network location of the integration tests 103 or include the actual integration tests 103. The test request 109 might also include the test selection criteria 206, might specify a desired load that the load-generating instances 108 are to submit to the SUT 106, and the other test parameters 210 described above. The test request 109 can include other types of data in other configurations.

From operation 506, the routine 500 proceeds to operation 508, where the control interface 112, or another component, identifies the tests that are available for use in load and performance testing of the SUT 106. As described above, for example, in some configurations reflection is utilized on a repository, package, class, or other unit of program code to identify methods that have been tagged with an annotation 105 indicating that the method is suitable for use as a test. Other mechanisms can also be utilized to identify integration tests 103 that are available for use in load and performance testing.

From operation 508, the routine 500 proceeds to operation 510, where the control interface 112, or another component, utilizes the test selection criteria 206 and the annotations 105 to select integration tests 103 for use in testing the SUT 106 from available tests 103. As discussed above, the test selection criteria 206 can specify required annotations 105 or other attributes that an integration test 103 is to have in order to be utilized to test the SUT 106. Additionally, the other test parameters 210 can also be utilized to select the integration tests 103 to be utilized in the manner described above. Other data, metadata, attributes, annotations, and aspects of the integration tests 103 and/or the SUT 106 can also, or alternately, be utilized to select the integration tests 103 to be utilized to test the SUT 106.

From operation 510, the routine 500 proceeds to operation 512, where the control interface 112, or another component, creates a load-generating job 212 for the integration test 103, or tests, selected at operation 510. The load-generating job 212 for the integration test 103, or tests, is then placed on the job queue 302 at operation 514. As discussed above, and in greater detail below, the load-generating instances 108 can dequeue the load-generating job 212 from the job queue 302 and execute the specified integration test 103, or tests, in the manner described below.

From operation 514, the routine 500 proceeds to operation 516, where the control interface 112, or another component, determines whether there are additional integration tests 103 to execute. If so, the routine 500 proceeds back to operation 510, where additional integration tests 103 can be selected and executed in the manner described above. If no additional integration tests 103 remain to be executed, the routine 500 proceeds from operation 516 to operation 518, where it ends.

Figure 6A:
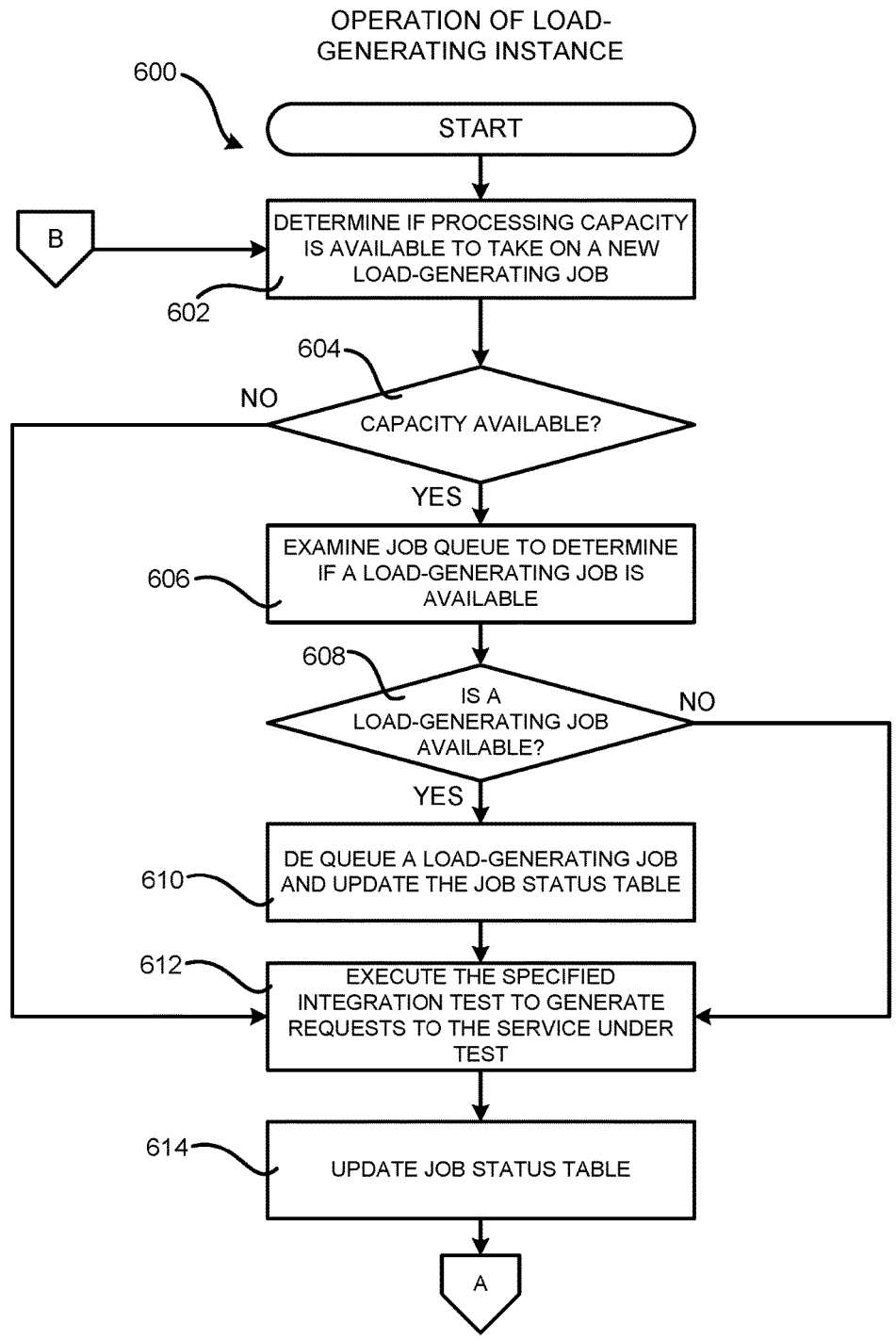
FIGS. 6A and 6B are flow diagrams showing a routine that illustrates additional aspects of the operation of a load-generating instance operating in conjunction with a distributed load and performance evaluation framework capable of utilizing integration tests to perform load and performance testing of a network service, according to one configuration disclosed herein.
Figure 6B:
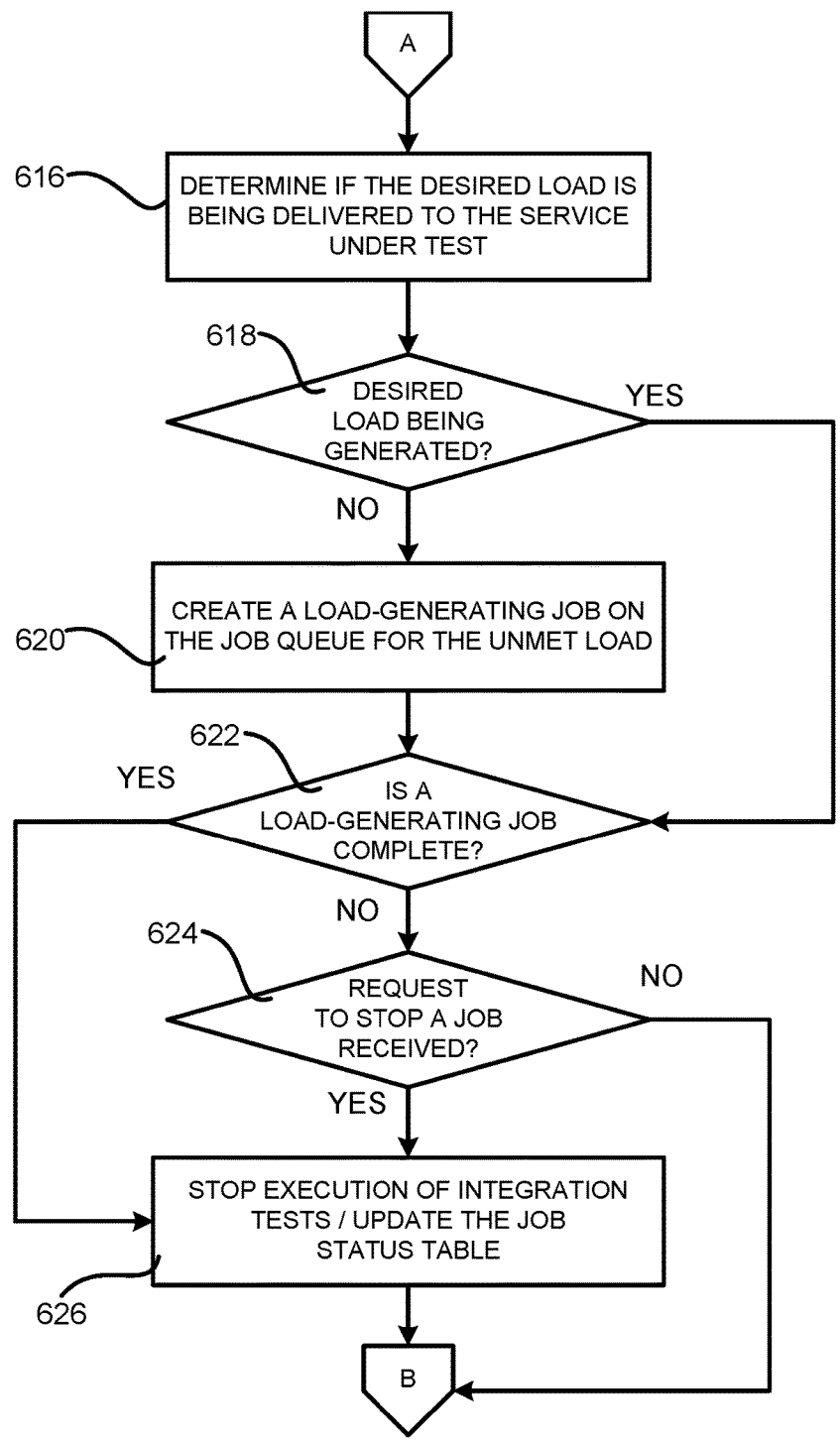

FIGS. 6A and 6B are flow diagrams that show a routine 600 that illustrates additional aspects of the operation of a load-generating instance 108 operating in conjunction with a distributed performance evaluation framework to utilize integration tests 103 to perform load and performance testing of a SUT 106, according to one configuration disclosed herein. The routine 600 begins at operation 602, where a load-generating instance 108 determines if it has processing capacity available to start a new load-generating job 212. For example, the load-generating instance 108 might determine whether it has excess CPU or memory capacity to begin executing one or more integration tests 103. If the load-generating instance 108 determines that it has processing capacity available for a new job, the routine 600 proceeds from operation 604 to operation 606. If the load-generating instance 108 determines that it does not have available processing capacity for executing integration tests 106, the routine 600 proceeds from operation 604 to operation 612, described below.

At operation 606, the load-generating instance 108 examines the job queue 302 to determine if a load-generating job 212 is available. If there are no load-generating jobs 212 on the job queue 302, the routine 600 proceeds from operation 608 to operation 612, described below. If there is at least one load-generating job 212 on the job queue 302, the routine 600 proceeds from operation 608 to operation 610.

At operation 610, the load-generating instance 108 dequeues a load-generating job 212 from the job queue 302. The load-generating instance 108 might also update an entry in the job status table 308 for the job. For example, the load-generating instance 108 might update an entry in the job status table 308 to indicate that the job has been taken off of the job queue 302 and/or that an integration test 103 has started executing.

The routine 600 then proceeds from operation 610 to operation 612, where the load-generating instance 108 executes the integration tests 103, or tests, specified by the dequeued load-generating job 212 to generate the requests 104 to the SUT 106. As discussed above, the load-generating instance 108 might execute a number of load-generating threads 404 to simultaneously execute multiple integration tests 103. The load-generating threads 404 can be executed separately from the reporting/monitoring threads 402.

From operation 612, the routine 600 proceeds to operation 614, where the load-generating instance 108 can update an entry in the job status table 308 for the job. For example, the load-generating instance 108 might update an entry in the job status table 308 to indicate the number of requests 104 that are being submitted to the SUT 106. As mentioned above, the load-generating instance 108 might execute one or more reporting/monitoring threads 402 to update the job status table 308. The reporting/monitoring threads 402 are executed separately from the load-generating threads 404 responsible for generating the requests 104 to the SUT 106 in one configuration.

From operation 614, the routine 600 proceeds to operation 616, where the load-generating instance 108 determines if the desired load specified by the test request 109 is being delivered to the SUT 106. If the desired load is being delivered to the SUT 106, the routine 600 proceeds from operation 618 to operation 622, described below. If the desired load is not being delivered to the SUT 106, the routine 600 proceeds from operation 618 to operation 620.

At operation 620, the load-generating instance 108 creates a new load-generating job 212 on the job queue 302 for the unmet load (e.g. unmet number of requests 104 per time period). As discussed above, the load-generating instance 108 also reduces its own target number of requests per time period by the same amount. In this way, another load-generating instance 108 can dequeue the job and assist in providing the desired load to the SUT 106 by executing additional integration tests 103. From operation 620, the routine 600 proceeds to operation 622.

At operation 622, the load-generating instance 108 determines whether a load-generating job 212 has been completed. For example, and as described above, a load-generating job 212 might be completed after a certain amount of time has elapsed, after a certain number of requests 104 have been delivered to the SUT 106, after an integration test 103, or tests, have completed execution, or after another condition, or conditions, have occurred. If a load-generating job 212 has completed, the routine 600 proceeds from operation 622 to operation 626, described below. If a load-generating job 212 has not completed, the routine 600 proceeds from operation 622 to operation 624.

At operation 624, the load-generating instance 108 determines if a control command 114 has been received indicating that a load-generating job 212 should be stopped. As mentioned above, the control interface 112 might receive control commands 114 by way of a UI or an API, such as a network service API. The control commands 114 can then be provided to the load-generating tier 102. For example, the control interface 112 might update an entry in the job status table 308 indicating that a particular job should be stopped. If such a command has not been received, the routine 600 proceeds from operation 624 to operation 602, described above.

If a request to stop a load-generating job 212 has been received, the routine 600 proceeds from operation 624 to operation 626. At operation 626, the load-generating instance 108 stops the execution of the currently executing integration tests 103. The load-generating instance 108 might also update the job status table 308 to indicate that the job is stopping and, ultimately, that the job has been stopped. From operation 626, the routine 600 proceeds back to operation 602, where the processing described above can be repeated.

Figure 7:
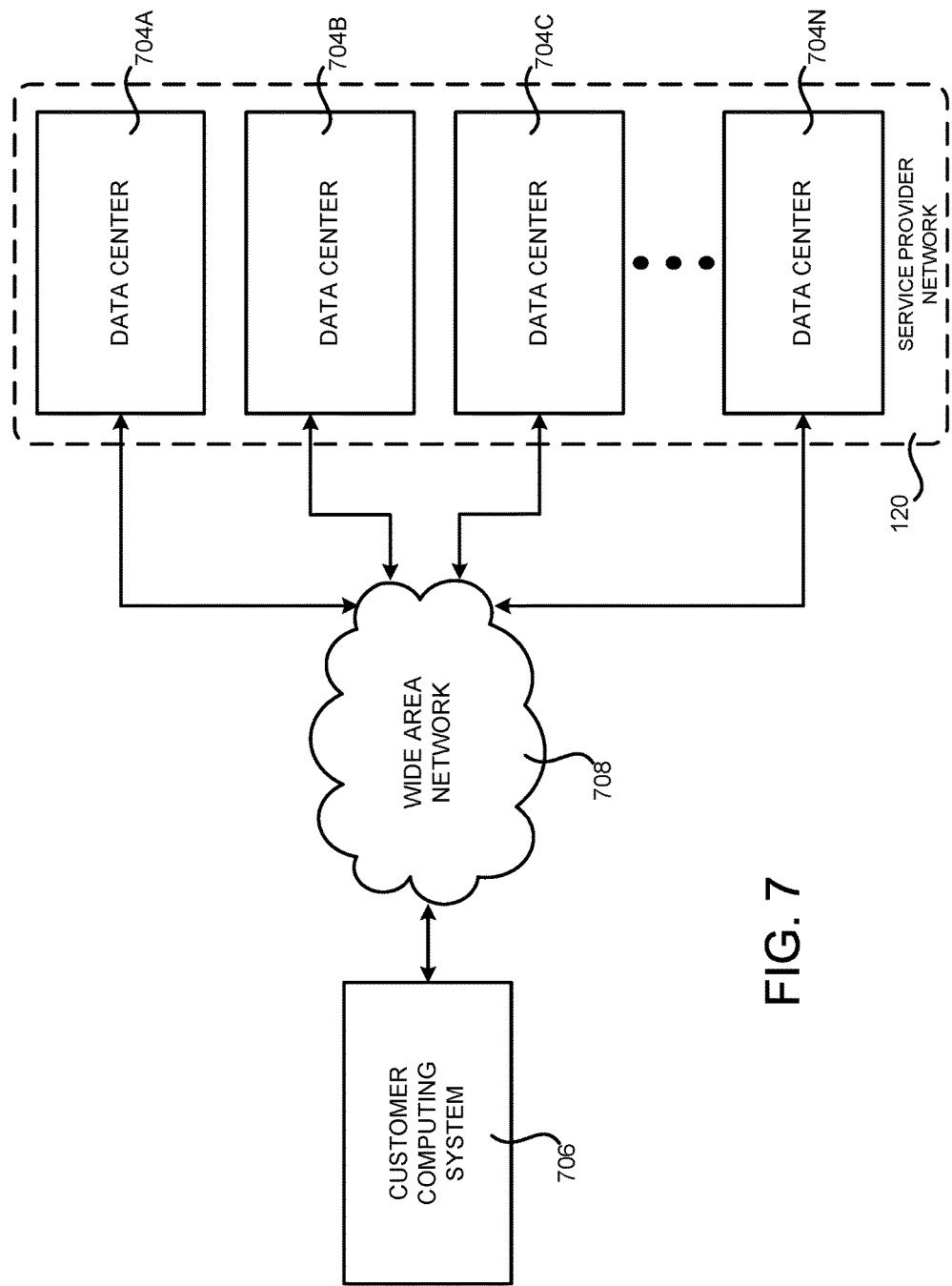
FIG. 7 is a system and network diagram that shows one illustrative operating environment for the configurations disclosed herein that includes a service provider network that provides functionality for implementing aspects of a distributed performance evaluation framework capable of executing integration tests for load and performance testing, according to one configuration disclosed herein.

FIG. 7 is a system and network diagram that shows one illustrative operating environment for the configurations disclosed herein that includes a service provider network 120 that provides functionality for implementing aspects of the distributed performance evaluation framework described above that is capable of executing integration tests 103 for load and performance testing, according to one configuration disclosed herein. As discussed above, the service provider network 120 can execute network services that provide computing resources on a permanent or an as-needed basis. Among other types of functionality, the computing resources provided by the service provider network 120 can be utilized to implement the various services described herein. As also discussed above, the computing resources provided by the service provider network 120 can include various types of computing resources, such as data processing resources like VM instances, data storage resources, networking resources, data communication resources, network services, and the like.

Each type of computing resource provided by the service provider network 120 can be general-purpose or can be available in a number of specific configurations. For example, data processing resources can be available as physical computers or VM instances in a number of different configurations. The VM instances can be configured to execute applications, including Web servers, application servers, media servers, database servers, some or all of the services described above, and/or other types of software. Data storage resources can include file storage devices, block storage devices, and the like. The service provider network 120 might also be configured to provide other types of computing resources not mentioned specifically herein.

As also discussed above, the computing resources 108 provided by the service provider network 120 are enabled in one implementation by one or more data centers 704A-704N (which might be referred to herein singularly as "a data center 704" or in the plural as "the data centers 704"). The data centers 704 are facilities utilized to house and operate computer systems and associated components. The data centers 704 typically include redundant and backup power, communications, cooling, and security systems. The data centers 704 can also be located in geographically disparate locations. One illustrative configuration for a data center 704 that might be utilized to implement the technologies disclosed herein will be described below with regard to FIG. 8.

The customers and other users of the service provider network 120 can access the computing resources provided by the service provider network 120 over a network 708, which can be a wide area communication network ("WAN"), such as the Internet, an intranet or an Internet service provider ("ISP") network or a combination of such networks. For example, and without limitation, a computing system 706 operated by a customer or other user of the service provider network 120, such as the developer computing device 107, might be utilized to access the service provider network 120 by way of the network 708. It should be appreciated that a local-area network ("LAN"), the Internet, or any other networking topology known in the art that connects the data centers 704 to remote customers and other users can be utilized. It should also be appreciated that combinations of such networks might also be utilized.

Figure 8:
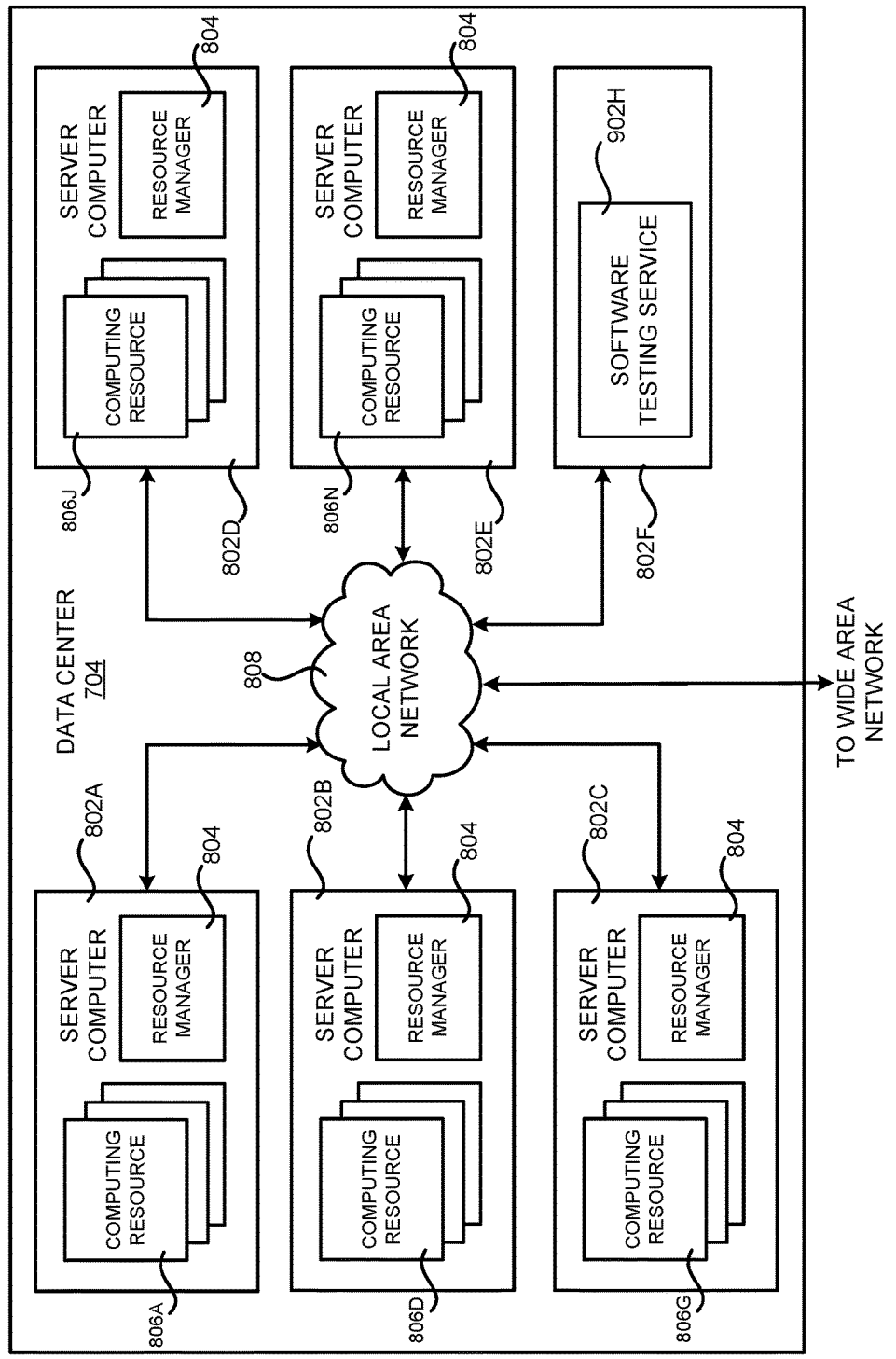
FIG. 8 is a computing system diagram that illustrates one configuration for a data center that can be utilized to implement aspects of the distributed load and performance evaluation framework disclosed herein, according to one configuration disclosed herein.

FIG. 8 is a computing system diagram that illustrates one configuration for a data center 704 that can be utilized to implement aspects of the distributed performance evaluation framework disclosed herein, according to one configuration disclosed herein. The example data center 704 shown in FIG. 8 includes several server computers 802A-802F (which might be referred to herein singularly as "a server computer 802" or in the plural as "the server computers 802") for providing the computing resources 806A-806E.

The server computers 802 can be standard tower, rackmount, or blade server computers configured appropriately for providing the computing resources 806 described herein (illustrated in FIG. 8 as the computing resources 806A-806E). As mentioned above, the computing resources 806 provided by the service provider network 120 might be data processing resources such as VM instances or hardware computing systems, data storage resources, database resources, networking resources, and others. Some of the servers 802 might also be configured to execute network services capable of instantiating, providing and/or managing the computing resources 806, some of which are described in detail below with regard to FIG. 9.

The data center 704 shown in FIG. 8 also includes a server computer 802F that can execute some or all of the software components described above. For example, and without limitation, the server computer 802F might be configured to execute a software testing service 902D that provides some or all of the functionality of the distributed performance evaluation framework described above with regard to FIGS. 1-6B. The server computer 802F might also be configured to execute other components and/or to store data for providing some or all of the functionality described herein. In this regard, it should be appreciated that the software testing service 902D might execute on many other physical or virtual servers in the data center 704 in various configurations.

In the example data center 704 shown in FIG. 8, an appropriate LAN 808 is also utilized to interconnect the server computers 802A-802F. The LAN 808 is also connected to the network 708 illustrated in FIG. 7. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components might also be utilized for balancing a load between each of the data centers 704A-704N, between each of the server computers 802A-802F in each data center 704, and, potentially, between computing resources 806 in each of the data centers 704. It should be appreciated that the configuration of the data center 704 described with reference to FIG. 8 is merely illustrative and that other implementations might be utilized.

Figure 9:
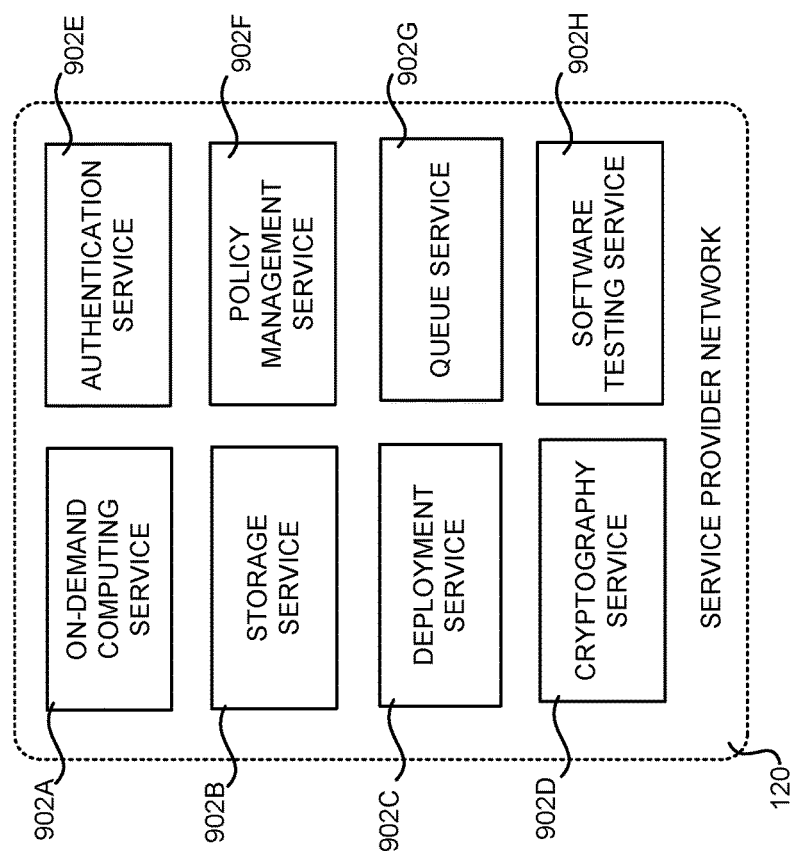
FIG. 9 is a system and network diagram that shows aspects of several services that might be provided by and utilized within a service provider network in order to implement aspects of the functionality described in the various configurations disclosed herein.

FIG. 9 is a system and network diagram that shows aspects of several services that might be provided by and utilized within a service provider network 120 in order to implement aspects of the functionality described above for utilizing integration tests 103 for load and performance testing of a network service. In particular, and as discussed above, the service provider network 120 can provide a variety of network services to customers and other users of the service provider network 120 including, but not limited to, an on-demand computing service 902A, a storage service 902B, a deployment service 902C, a cryptography service 902D, an authentication service 902E, a policy management service 902F, and a queue service 902G, each of which is described in greater detail below. As discussed above, the service provider network 120 can also provide a software testing service 902H that implements the framework described above for executing integration tests 103 for load and performance testing of a network service. Additionally, the service provider network 120 might also provide other services, some of which are described in greater detail below.

It should be appreciated that customers of the service provider network 120 can include organizations or individuals that utilize some or all of the services provided by the service provider network 120. As described above, a customer or other user can communicate with the service provider network 120 through a network, such as the network 708 shown in FIG. 7. Communications from a customer computing device, such as the developer computing device 107 shown in FIG. 1, to the service provider network 120 can cause the services provided by the service provider network 120 to operate in accordance with the described configurations or variations thereof.

It is noted that not all configurations described include the services described with reference to FIG. 9 and that additional network services can be provided in addition to or as an alternative to the services explicitly described herein. Each of the services 902 shown in FIG. 9 might also expose Web service interfaces or other types of network service interfaces that enable a caller to submit appropriately configured application programming interface ("API") calls to the various services through Web or network service requests. In addition, each of the services 902 might include service interfaces that enable the services 902 to access each other (e.g., to enable a virtual computer system provided by the on-demand computing service 902A to store data in or retrieve data from the data storage service 902B). Additional details regarding some of the services shown in FIG. 9 will now be provided.

The on-demand computing service 902A can be a collection of computing resources configured to instantiate VM instances and to provide other types of computing resources 806 on demand. For example, a customer or other user of the service provider network 120 can interact with the on-demand computing service 902A (via appropriately configured and authenticated API calls) to provision and operate VM instances that are instantiated on physical computing devices hosted and operated by the service provider network 120. The VM instances can be used for various purposes, such as to operate as servers supporting a website, to operate business applications, to implement load-generating instances 108 or, generally, to serve as computing resources for the customer. Other applications for the VM instances can be to support database applications, electronic commerce applications, business applications and/or other applications. Although the on-demand computing service 902A is shown in FIG. 9, any other computer system or computer system service can be utilized in the service provider network 120, such as a computer system or computer system service that does not employ virtualization and instead provisions computing resources on dedicated or shared computers/servers and/or other physical devices.

The storage service 902B might include software and computing resources that collectively operate to store data using block or file-level storage devices (and/or virtualizations thereof). The storage devices of the storage service 902B might, for instance, be operationally attached to virtual computer systems provided by the on-demand computing service 902A to serve as logical units (e.g., virtual drives) for the computer systems. A storage device might also enable the persistent storage of data used/generated by a corresponding virtual computer system where the virtual computer system service might only provide ephemeral data storage.

The service provider network 120 can also include a cryptography service 902D. The cryptography service 902D can utilize storage services of the service provider network 120, such as the storage service 902B, to store encryption keys in encrypted form, whereby the keys can be usable to decrypt customer keys accessible only to particular devices of the cryptography service 902D. The cryptography service 902D might also provide other types of functionality not specifically mentioned herein.

As illustrated in FIG. 9, the service provider network 120, in various configurations, also includes an authentication service 902E and a policy management service 902F. The authentication service 902E, in one example, is a computer system (i.e., collection of computing resources 806) configured to perform operations involved in authentication of users. For instance, one of the services 902 shown in FIG. 9 can provide information from a user to the authentication service 902E to receive information in return that indicates whether or not the requests submitted by the user are authentic.

The policy management service 902F, in one example, is a network service configured to manage policies on behalf of customers or internal users of the service provider network 120. The policy management service 902F can include an interface that enables customers to submit requests related to the management of policy. Such requests can, for instance, be requests to add, delete, change or otherwise modify policy for a customer, service, or system, or for other administrative actions, such as providing an inventory of existing policies and the like.

The service provider network 120 can additionally maintain other services based, at least in part, on the needs of its customers. For instance, the service provider network 120 can maintain a deployment service 902C for deploying software, a queue service 902G for creating and utilizing queues, and/or a database service (not shown in FIG. 9) in some configurations. A database service can be a collection of computing resources that collectively operate to create, maintain, and allow queries to be performed on databases stored within the service provider network 120. For example, a customer or other user of the service provider network 120 can operate and manage a database from the database service by utilizing appropriately configured network API calls. This, in turn, can allow the customer to maintain and potentially scale the operations in the database. Other services include object-level archival data storage services, and services that manage, monitor, interact with, or support other services. The service provider network 120 might also be configured with other network services not specifically mentioned herein in other configurations.

Figure 10:
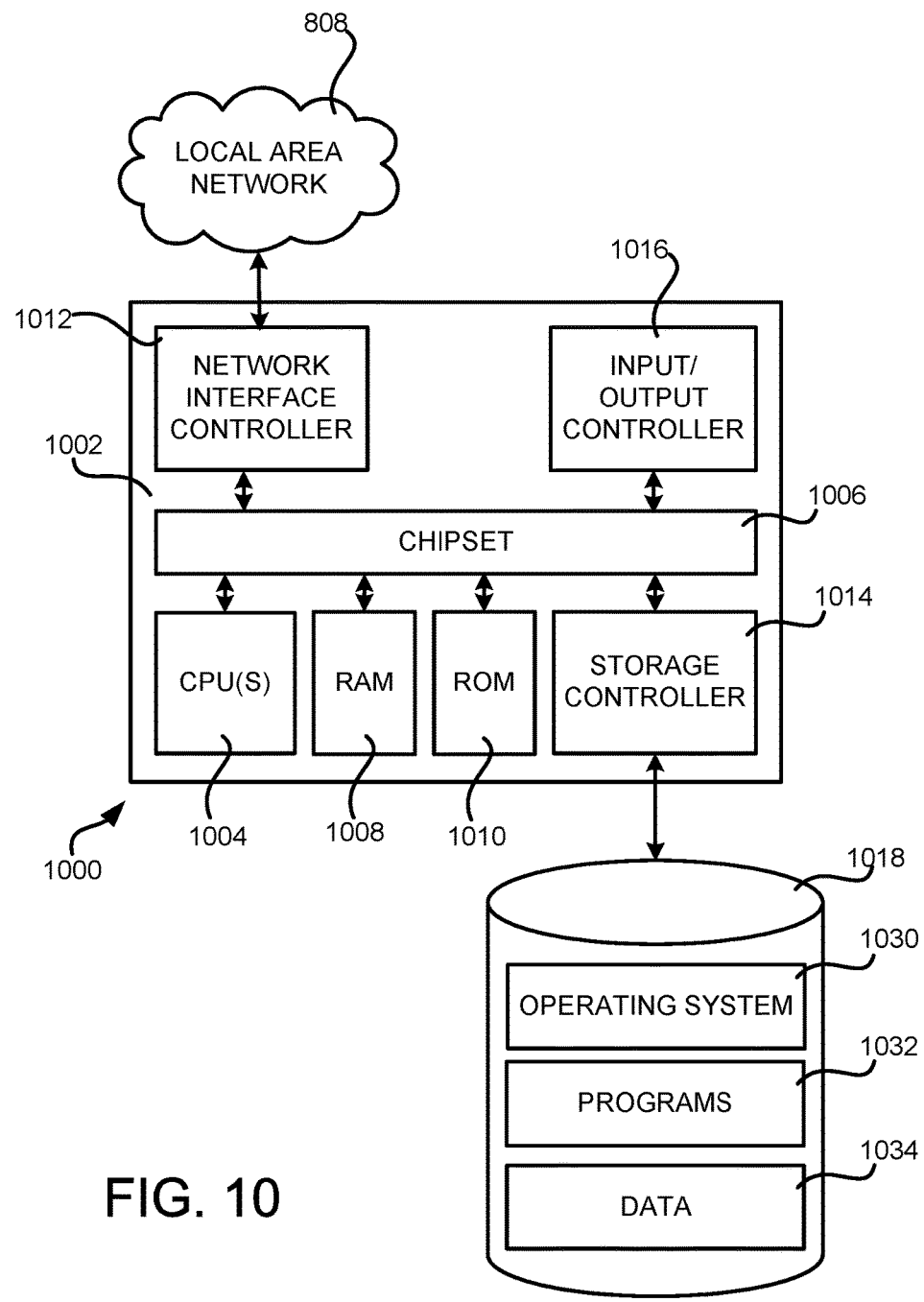
FIG. 10 is a computer architecture diagram showing an illustrative computer hardware architecture for implementing a computing device that might be utilized to implement aspects of the various configurations presented herein.

FIG. 10 is a computer architecture diagram showing an illustrative computer hardware architecture for implementing a computing device that might be utilized to implement aspects of the various configurations presented herein. The computer architecture shown in FIG. 10 illustrates a conventional server computer, workstation, desktop computer, laptop, tablet, network appliance, e-reader, smartphone, or other computing device, and can be utilized to execute any of the software components presented herein.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components for operating the computer 1000 in accordance with the configurations described herein.

The computer 1000 can operate in a networked environment using logical connections to remote computing devices and computer systems through a network, such as the network 808. The chipset 1006 can include functionality for providing network connectivity through a NIC 1012, such as a gigabit Ethernet adapter. The NIC 1012 is capable of connecting the computer 1000 to other computing devices over the network 808. It should be appreciated that multiple NICs 1012 can be present in the computer 1000, connecting the computer to other types of networks and remote computer systems.

The computer 1000 can be connected to a mass storage device 1018 that provides non-volatile storage for the computer. The mass storage device 1018 can store an operating system 1030, programs 1032, and data 1034, which have been described in greater detail herein. The mass storage device 1018 can be connected to the computer 1000 through a storage controller 1014 connected to the chipset 1006. The mass storage device 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the mass storage device 1018 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1018 is characterized as primary or secondary storage, and the like.

For example, the computer 1000 can store information to the mass storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the mass storage device 1018 by detecting the physical states or characteristics of one or more particular locations within the physical storage units.

In addition to the mass storage device 1018 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1018 can store an operating system 1030 utilized to control the operation of the computer 1000. According to one configuration, the operating system comprises the LINUX operating system. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 1018 can store other system or application programs and data utilized by the computer 1000.

In one configuration, the mass storage device 1018 or other computer-readable storage media is encoded with computer-executable instructions which, when loaded into the computer 1000, transform the computer from a general-purpose computing system into a special-purpose computer capable of implementing the configurations described herein. These computer-executable instructions transform the computer 1000 by specifying how the CPUs 1004 transition between states, as described above. According to one configuration, the computer 1000 has access to computer-readable storage media storing computer-executable instructions which, when executed by the computer 1000, perform the various processes described above with regard to FIGS. 1-6B. The computer 1000 might also include computer-readable storage media for performing any of the other computer-implemented operations described herein.

The computer 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, a plotter, or other type of output device. It will be appreciated that the computer 1000 might not include all of the components shown in FIG. 10, can include other components that are not explicitly shown in FIG. 10, or might utilize an architecture completely different than that shown in FIG. 10.

Based on the foregoing, it should be appreciated that technologies for providing a distributed performance evaluation framework capable of executing integration tests to evaluate the performance of a network service have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system for evaluating performance of a network service, the system comprising:
   one or more computing systems configured to provide a control and reporting tier configured to:
      receive a request by way of a network service application programming interface (API) to perform testing on the network service, the request comprising data identifying a plurality of integration tests and test selection criteria; and
      in response to receiving the request, utilize the test selection criteria to select one or more integration tests from the plurality of integration tests, generate one or more load-generating jobs specifying the one or more integration tests, and
      provide the one or more load-generating jobs to a load-generating tier, wherein each of the one or more integration tests is tagged with a first annotation indicating that each integration test of the one or more integration tests is included in a suite of integration tests,
      wherein at least one of the one or more integration tests is tagged with a second annotation identifying a test parameter provider used by the at least one of the one or more integration tests, and
      wherein the first and second annotations are utilized in conjunction with the test selection criteria to select the one or more integration tests from the plurality of integration tests; and
   one or more other computing systems configured to:
      provide the load-generating tier, the load-generating tier comprising one or more load-generating instances configured to receive the one or more load-generating jobs and to execute the one or more integration tests to generate requests to the network service.

2. The system of claim 1, wherein the control and reporting tier is further configured to utilize reflection to identify the plurality of integration tests.

3. The system of claim 2, wherein at least one of the one or more integration tests is tagged with a third annotation, and wherein the third annotation is utilized to identify that the at least one of the one or more integration tests is available for use in testing the network service.

4. The system of claim 1, wherein the one or more integration tests are each tagged with a third annotation indicating whether a particular integration test of the one or more integration tests is a positive test or a negative test, and wherein the third annotation is utilized in conjunction with the test selection criteria to select the one or more integration tests from the plurality of integration tests.

5. The system of claim 1, wherein at least one of the one or more integration tests is tagged with a third annotation indicating that the at least one of the integration tests is dependent upon one or more other integration tests, and wherein the third annotation is utilized in conjunction with the test selection criteria to select the one or more integration tests from the plurality of integration tests.

6. The system of claim 1, wherein the request further comprises one or more test parameters specifying that the one or more integration tests are to be executed on the one or more test-generating instances randomly, sequentially, or in a specified order.

7. A computer-implemented method, comprising:
   providing a network service application programming interface (API) for receiving a request to test a network service, the request comprising data identifying a plurality of integration tests and test selection criteria;
   utilizing the test selection criteria to select one or more integration tests from the plurality of integration tests, wherein each of the one or more integration tests is tagged with a first annotation indicating that each integration test is included in a suite of integration tests, wherein at least one of the one or more integration tests is tagged with a second annotation identifying a test parameter provider used by the at least one of the one or more integration tests, and wherein the first and second annotations are utilized in conjunction with the test selection criteria to select the one or more integration tests from the plurality of integration tests;
   generating one or more load-generating jobs specifying the one or more integration tests; and
   providing the one or more load-generating jobs to a load-generating tier configured to execute the one or more integration tests on one or more test-generating instances to generate requests to the network service.

8. The computer-implemented method of claim 7, further comprising utilizing reflection to identify the plurality of integration tests.

9. The computer-implemented method of claim 7, wherein at least one of the one or more integration tests is tagged with a third annotation, and wherein the third annotation is utilized to identify that the at least one of the one or more integration tests is available for use in testing the network service.

10. The computer-implemented method of claim 7, wherein the one or more integration tests are each tagged with a third annotation indicating whether a particular integration test of the one or more integration tests is a positive test or a negative test, and wherein the third annotation is utilized in conjunction with the test selection criteria to select the one or more integration tests from the plurality of integration tests.

11. The computer-implemented method of claim 7, wherein at least one of the one or more integration tests is tagged with a third annotation indicating that the at least one of the one or more integration tests is dependent upon one or more other integration tests, and wherein the third annotation is utilized in conjunction with the test selection criteria to select the one or more integration tests from the plurality of integration tests.

12. The computer-implemented method of claim 7, wherein the request to perform testing on the network service further comprises one or more test parameters specifying that the one or more integration tests are to be executed on the one or more test-generating instances randomly, sequentially, or in a specified order.

13. A non-transitory computer-readable storage medium having computer-executable instructions stored thereupon which, when executed by a computer, cause the computer to:
receive, by way of a network service application programming interface (API), a request to test a network service, the request comprising data identifying a plurality of integration tests and test selection criteria;
select one or more integration tests from the plurality of integration tests based, at least in part, on the test selection criteria,
wherein each of the one or more integration tests is tagged with a first annotation indicating that each integration test of the one or more integration tests is included in a suite of integration tests, wherein at least one of the one or more integration tests is tagged with a second annotation identifying a test parameter provider used by the at least one of the one or more integration tests, and wherein the first and second annotations are utilized in conjunction with the test selection criteria to select the one or more integration tests from the plurality of integration tests; and
transmit one or more load-generating jobs identifying the one or more integration tests to a load-generating tier configured to execute the one or more integration tests on one or more test-generating instances to generate requests to the network service.

14. The non-transitory computer-readable storage medium of claim 13, having further computer-executable instructions stored thereupon to:
identify the one or more integration tests as integration tests that are available for use in testing the network service using reflection, and
wherein to select the one or more integration tests from the plurality of integration tests based, at least in part, on the test selection criteria comprises utilizing the test selection criteria to select the one or more integration tests from the plurality of integration tests that are available for use in testing the network service.

15. The non-transitory computer-readable storage medium of claim 14, wherein at least one of the one or more integration tests is tagged with a third annotation, and wherein the third annotation is utilized to identify which of the one or more integration tests that is available for use in testing the network service.

16. The non-transitory computer-readable storage medium of claim 13, wherein at least one of the one or more integration tests is tagged with a third annotation identifying a test parameter provider used by the at least one of the one or more integration tests, and wherein the third annotation is utilized in conjunction with the test selection criteria to select the one or more integration tests from the plurality of integration tests.

17. The non-transitory computer-readable storage medium of claim 13, having further computer-executable instructions stored thereupon to:
identify the plurality of integration tests utilizing reflection.

18. The non-transitory computer-readable storage medium of claim 13, wherein at least one of the one or more integration tests is tagged with a third annotation indicating that the at least one of the one or more integration tests is dependent upon one or more other integration tests, and wherein the third annotation is utilized in conjunction with the test selection criteria to select the one or more integration tests from the plurality of integration tests.

* * * * *